(12) United States Patent
Gray et al.

(10) Patent No.: US 12,078,272 B2
(45) Date of Patent: Sep. 3, 2024

(54) TERMINATION OF A FLEXIBLE PIPE

(71) Applicant: BAKER HUGHES ENERGY TECHNOLOGY UK LIMITED, Bristol (GB)

(72) Inventors: Christopher Gray, Newcastle upon Tyne (GB); Philip Nott, Newcastle (GB); Ashley Clack, Blythe (GB); John McNab, Newcastle (GB)

(73) Assignee: BAKER HUGHES ENERGY TECHNOLOGY UK LIMITED, Bristol (GB)

( * ) Notice: Subject to any disclaimer, the term of this patent is extended or adjusted under 35 U.S.C. 154(b) by 685 days.

(21) Appl. No.: 17/206,556

(22) Filed: Mar. 19, 2021

(65) Prior Publication Data

US 2021/0207749 A1 Jul. 8, 2021

Related U.S. Application Data

(62) Division of application No. 15/571,361, filed as application No. PCT/GB2016/051216 on Apr. 28, 2016, now abandoned.

(30) Foreign Application Priority Data

May 6, 2015 (GB) ..................................... 1507718

(51) Int. Cl.
*F16L 33/01* (2006.01)
*B23P 6/00* (2006.01)
(Continued)

(52) U.S. Cl.
CPC ................ *F16L 33/01* (2013.01); *B23P 6/00* (2013.01); *E21B 36/005* (2013.01); (Continued)

(58) Field of Classification Search
CPC ................ B23P 6/00; Y10T 29/49435; Y10T 29/49718; Y10T 29/49719;
(Continued)

(56) References Cited

U.S. PATENT DOCUMENTS 1,699,911 A 1/1929 Palmer
1,809,874 A 6/1931 Stone
(Continued)

FOREIGN PATENT DOCUMENTS

DE 3814410 A1 11/1989
EP 1078144 2/2001
(Continued)

OTHER PUBLICATIONS

International Search Report and Written Opinion for International Application No. PCT/GB2016/051216 dated Jul. 15, 2016.
(Continued)

*Primary Examiner* — Matthew P Travers
(74) *Attorney, Agent, or Firm* — Knobbe, Martens, Olson & Bear, LLP

(57) ABSTRACT

A method and apparatus are disclosed for re-terminating an end of a flexible pipe. The method comprises removing at least one original end fitting component (310, 335) from a multicomponent end fitting, secured to flexible pipe body at an end of a flexible pipe, leaving a retained portion (330, 360) of the end fitting in situ and subsequently securing at least one superseding end fitting component (310, 335) to the retained portion thereby providing a new fluid tight seal against a fluid retaining layer of the flexible pipe at a new sealing location axially displaced from an original sealing location.

16 Claims, 19 Drawing Sheets

(51) Int. Cl.
  *E21B 36/00* (2006.01)
  *F16L 11/08* (2006.01)
  *F16L 33/32* (2006.01)
  *F16L 53/30* (2018.01)
  *F16L 53/70* (2018.01)
  *F16L 55/07* (2006.01)

(52) U.S. Cl.
  CPC ............. *F16L 11/083* (2013.01); *F16L 33/32* (2013.01); *F16L 53/30* (2018.01); *F16L 53/70* (2018.01); *F16L 55/07* (2013.01); *F16L 2201/30* (2013.01); *Y10T 29/49726* (2015.01)

(58) Field of Classification Search
  CPC .. Y10T 29/49721; Y10T 29/4973; F16L 1/26; F16L 33/01; F16L 33/32
  See application file for complete search history.

(56) References Cited

U.S. PATENT DOCUMENTS

| | | |
|---|---|---|
| 1,948,211 A | 2/1934 | Fritz |
| 2,848,254 A | 8/1958 | Millar |
| 2,858,147 A | 10/1958 | Guarnaschelli |
| 2,940,778 A | 6/1960 | Kaiser |
| 3,306,637 A | 2/1967 | Press et al. |
| 3,844,587 A | 10/1974 | Fuhrmann et al. |
| 4,063,757 A | 12/1977 | Fuhrmann |
| 4,143,892 A | 3/1979 | Murphy et al. |
| 4,549,581 A | 10/1985 | Unno et al. |
| 4,573,527 A | 3/1986 | McDonough |
| 4,666,191 A | 5/1987 | Sotelo et al. |
| 4,729,583 A | 3/1988 | Lalikos et al. |
| 4,775,171 A | 10/1988 | Marshall |
| 4,813,715 A | 3/1989 | Policelli |
| 4,875,717 A | 10/1989 | Policelli |
| 4,950,001 A | 8/1990 | Briggs |
| 5,209,267 A | 5/1993 | Morin |
| 5,277,455 A | 1/1994 | Graves et al. |
| 5,330,236 A * | 7/1994 | Peterjohn ................ F16L 33/32 285/423 |
| 5,443,099 A | 8/1995 | Chaussepied et al. |
| 5,685,576 A | 11/1997 | Wolfe et al. |
| 5,782,270 A | 7/1998 | Goett et al. |
| 6,039,083 A | 3/2000 | Loper |
| 6,273,142 B1 | 8/2001 | Braad |
| 6,360,781 B1 | 3/2002 | Braad |
| 6,592,153 B1 | 7/2003 | Belcher |
| 6,742,813 B1 | 6/2004 | Glejbol |
| 8,479,829 B2 | 7/2013 | Stachowiak et al. |
| 8,499,799 B2 | 8/2013 | Saltel et al. |
| 9,297,214 B2 | 3/2016 | Shilling et al. |
| 2004/0066035 A1 | 4/2004 | Buon |
| 2004/0245774 A1 | 12/2004 | Eccleston |
| 2005/0093293 A1 | 5/2005 | Schwartz et al. |
| 2009/0160184 A1 | 6/2009 | Vo |
| 2009/0250925 A1 | 10/2009 | Eccleston et al. |
| 2009/0308478 A1 | 12/2009 | Vo |
| 2010/0025985 A1 | 2/2010 | De Aquino et al. |
| 2010/0308575 A1 | 12/2010 | Rodenburg |
| 2012/0211233 A1 | 8/2012 | Campello et al. |
| 2012/0211975 A1 | 8/2012 | Campello et al. |
| 2013/0192707 A1 | 8/2013 | Graham et al. |
| 2013/0241197 A1 | 9/2013 | Espinasse et al. |
| 2014/0049039 A1 | 2/2014 | Karabelas et al. |
| 2014/0165709 A1 | 6/2014 | Clements |
| 2014/0312612 A1 | 10/2014 | Dhagat et al. |
| 2015/0292663 A1 | 10/2015 | Glejbol et al. |
| 2016/0208969 A1 | 7/2016 | Bertoni et al. |
| 2018/0135754 A1 | 5/2018 | Veiga |
| 2018/0283588 A1 | 10/2018 | Gray et al. |

FOREIGN PATENT DOCUMENTS

| | | |
|---|---|---|
| EP | 2010747 | 1/2009 |
| EP | 2489824 A2 | 8/2012 |
| EP | 2492571 A2 | 8/2012 |
| EP | 2746635 B1 | 2/2016 |
| GB | 809097 A | 2/1959 |
| GB | 954051 | 4/1964 |
| GB | 2156031 A | 10/1985 |
| WO | WO 99/19654 | 4/1999 |
| WO | WO 2013/074098 | 5/2013 |
| WO | WO 2014/001236 | 1/2014 |
| WO | WO 2014/001237 A1 | 1/2014 |
| WO | WO 2014/001249 | 1/2014 |
| WO | WO 2014/012367 | 1/2014 |
| WO | WO 2014/170644 | 10/2014 |
| WO | WO 2015/027304 | 3/2015 |
| WO | WO 2016/170360 | 10/2016 |

OTHER PUBLICATIONS

International Preliminary Report on Patentability issued in International Application No. PCT/GB2016/051216 on Nov. 7, 2017.
Chinese Search Report for Application No. 201680026378.6, 2 pages.
U.S. Appl. No. 15/571,361, filed Nov. 2, 2017, Termination of a Flexible Pipe.

* cited by examiner

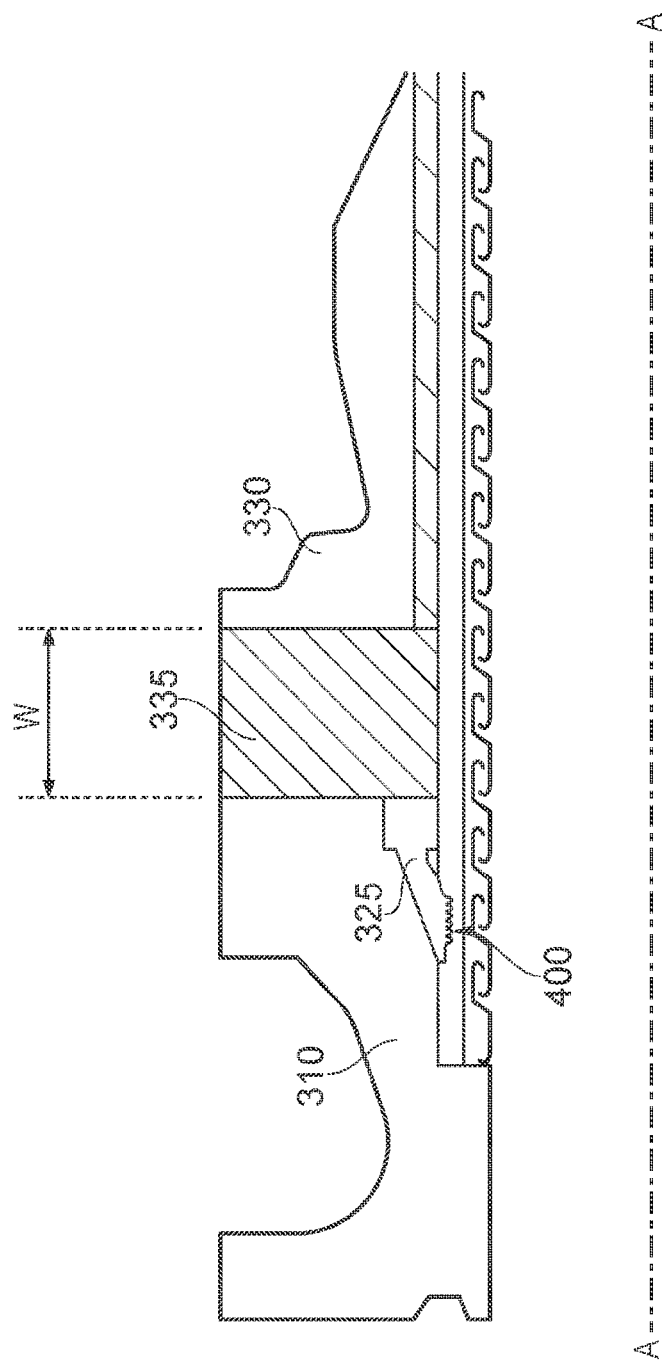

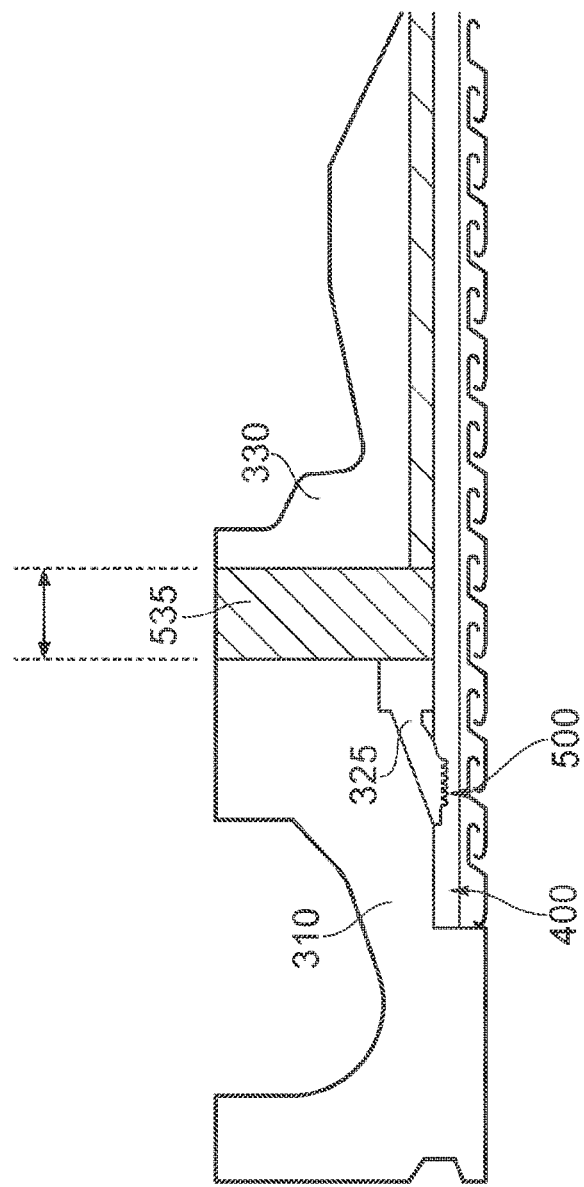

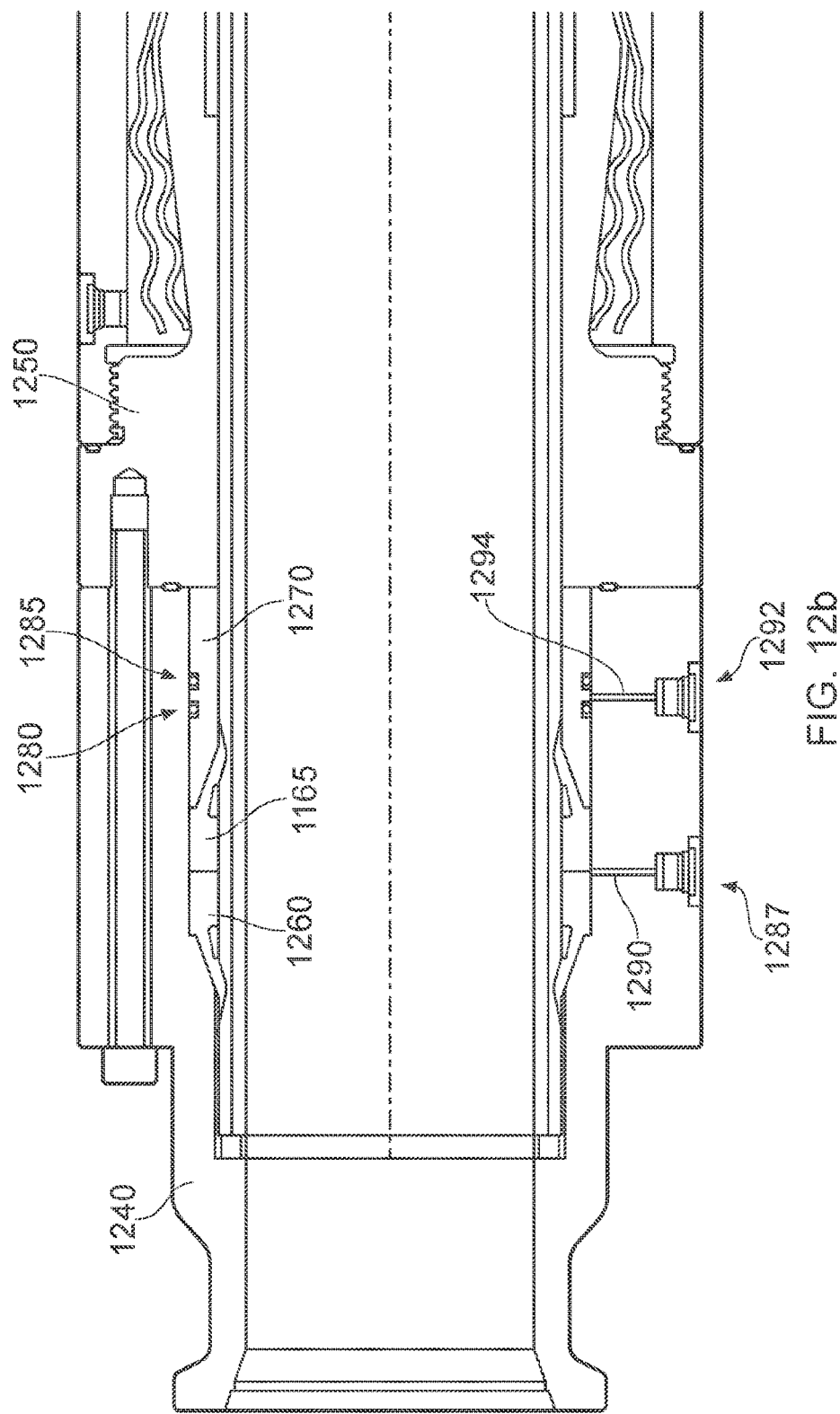

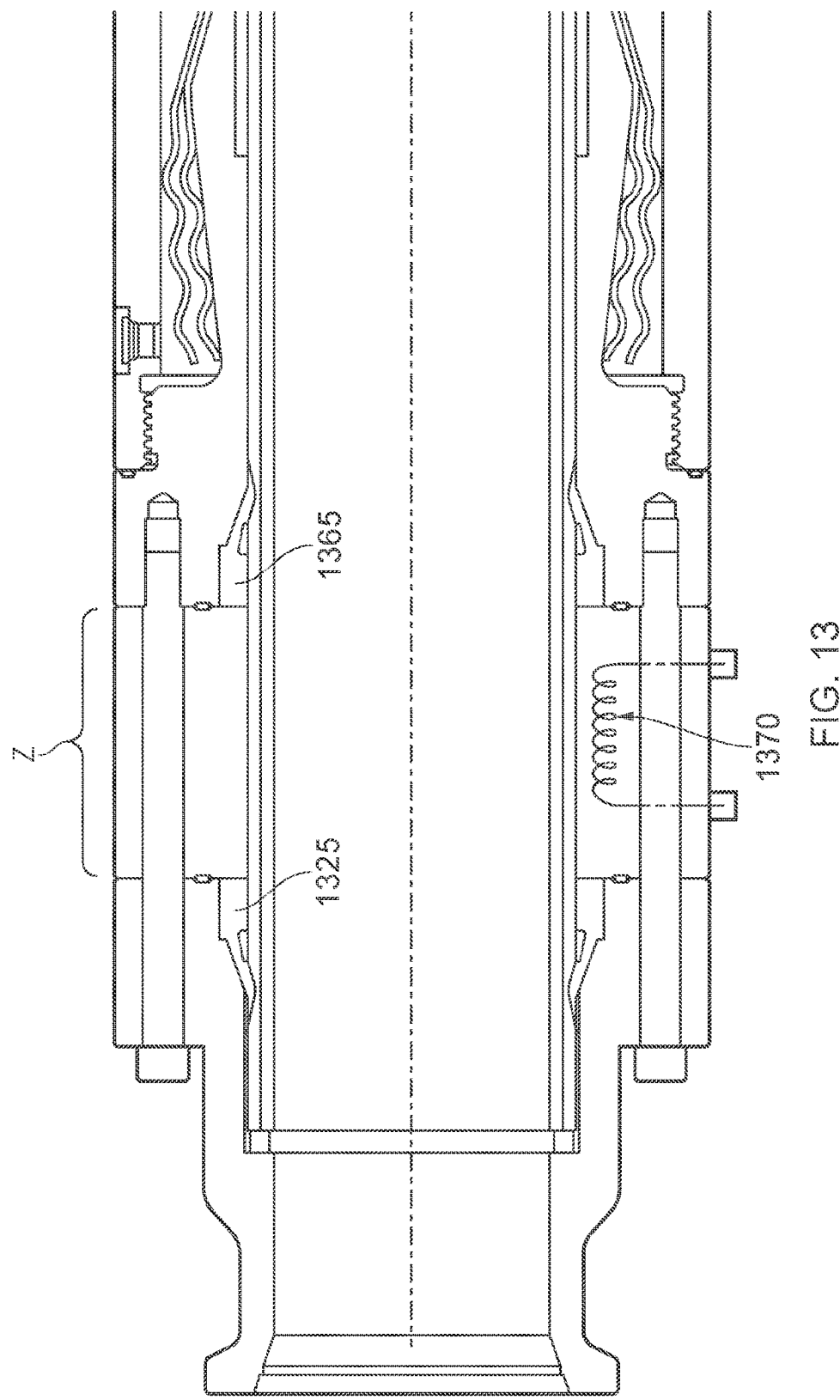

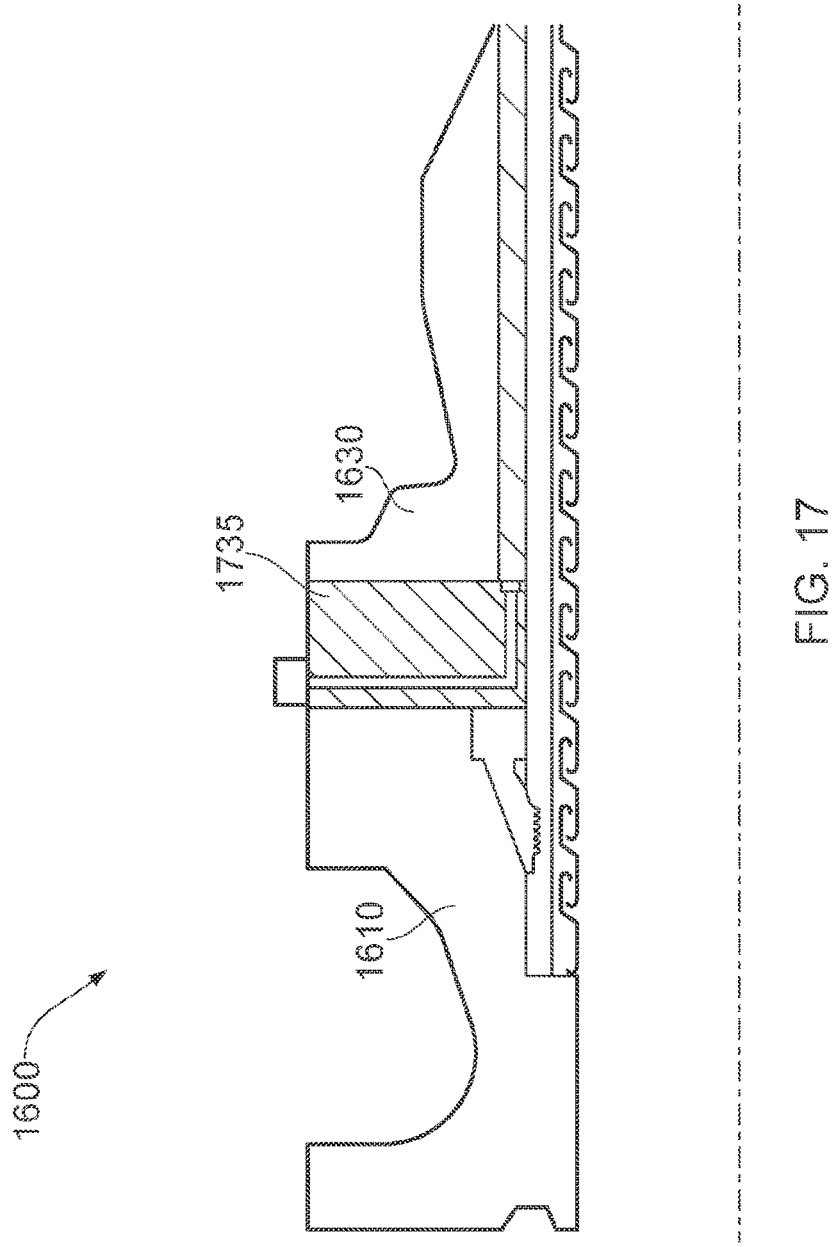

TERMINATION OF A FLEXIBLE PIPE

The present invention relates to a method and apparatus for re-terminating an end of a flexible pipe. In particular, but not exclusively, the present invention relates to an end fitting which makes possible the re-sealing of a barrier layer or liner and/or outer sheath of a flexible pipe to effect proper fluid sealing without removal and replacement of a whole end fitting assembly.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased. It is noted for the sake of completeness that flexible pipe may also be used for shallow water applications (for example less than around 500 metres depth) or even for shore (overland) applications.

Various conventional end fittings are known which are used to terminate a respective end of a segment of flexible pipe body of a flexible pipe. For example EP2492571 illustrates an end fitting which includes a termination portion, a core portion and an outer casing or jacket and which has a stated aim of reducing or eliminating residual tensions produced due to plastic deformation of tensile armour windings as the flexible pipe body is terminated in an end fitting.

Whilst the end fitting disclosed in EP2492571 may provide certain advantages it suffers from certain disadvantages which are suffered by many other conventional end fittings. Notably if an inner seal which seals against a fluid retaining layer of the flexible pipe body fails or is inadequately created then the end fitting must be removed in its entirety by cutting through the flexible pipe body, at a position beyond the end fitting, and a whole new (or re-furbished) end fitting secured to the newly made free end of the flexible pipe. This is a time consuming and costly process and can prove impossible in certain environments where a length of flexible pipe body is insufficient to reach a desired target structure when an end of the flexible pipe body has been cut off, shortened and re-terminated.

Likewise common to many conventional end fittings the ability to provide vent paths or connecting passageways to allow an annulus region or other region of the flexible pipe body to be vented or interconnected is limited. Likewise the provision of vent paths or fluid communication passageways are difficult if not impossible to introduce subsequent to an initial install operation. That is to say conventional end fittings provide limited or non-existent opportunity to retrofit elements which include passageways at desired locations subsequent to manufacture and original installation.

Still further some conventional end fittings allow axial creep of a fluid retaining layer such as a barrier layer or liner terminated in the end fitting. That is to say the fluid retaining layer can to some extent move laterally within the end fitting. This can create sealing problems. Conventional end fittings provide little or no ability to sense this motion nor indeed to sense other characteristics associated with the fluid retaining layer during use. Rather, in order to assess one or more characteristics associated with the fluid retaining layer, the end fitting and enveloped flexible pipe body must be cut off from a remainder of the flexible pipe and then the new pristine end of the flexible pipe body re-terminated by an entirely new end fitting. Conventionally parts of the flexible pipe body previously secured within the removed end fitting have thereafter been analysed. However, this can cause problems as noted above.

Still further the deterioration of the polymer fluid retaining layer through the service life is predicted currently using models and projecting from small scale simulation tests. In reality it will be understood by those skilled in the art that the specifics of each application and field dictate that the actual degree of deterioration or aging of the polymer may be somewhat different from that predicted. This becomes critical if it is desired that the equipment condition be analysed in order to extend its life beyond the original intended service life. At present the only means for determining the actual aged condition of the polymer fluid retaining layer is to either remove the pipe from service, cut off an end fitting and analyse the polymer, or to provide polymer test coupons which have to be suspended into contact with the service fluids flowing through the pipe. In many cases however the latter is not an option due to space constraints and the former is too costly.

Still furthermore conventional end fittings provide little or no ability to heat or cool a fluid retaining layer or bore fluid as it flows along a central bore defined by the fluid retaining layer of the flexible pipe body. Any heating or cooling that is possible is complicated to apply and cannot simply be retrofitted to an end fitting subsequent to an initial termination process.

It is an aim of the present invention to at least partly mitigate one or more of the above-mentioned problems.

It is an aim of certain embodiments of the present invention to provide a method and apparatus that can be used to allow the re-termination of an end fitting whilst ensuring a fluid tight seal can be recreated against a fluid retaining layer, such as a barrier layer or liner and/or outer sheath, of the flexible pipe.

It is an aim of certain embodiments of the present invention to provide a kit of parts which can be selected responsive to end fitting parts being replaced to thereby enable re-sealing of a barrier layer or liner and/or outer sheath subsequent to a replacement process.

It is an aim of certain embodiments of the present invention to enable a short section of a fluid retaining layer of a flexible pipe to be removed after use and thereafter analysed for inspection purposes without having to remove an entire end fitting from a flexible pipe and thereafter re-terminate a newly created entirely free end of flexible pipe body.

It is an aim of certain embodiments of the present invention to provide an end fitting which can always remain substantially attached to an end of a segment of flexible pipe body subsequent to an initial termination process but which allows a part or parts of the end fitting to be replaced once or repeatedly without having to remove the whole of the end fitting.

It is an aim of certain embodiments of the present invention to provide a method and apparatus for providing a vent path or other such open pathway (such as a pathway for a fibre or the like) to connect with a desired region of a flexible pipe.

It is an aim of certain embodiments of the present invention to provide a method and apparatus for providing a vent path, for venting annulus fluids of a flexible pipe, in an end fitting.

It is an aim of certain embodiments of the present invention to provide apparatus for retrofitting one or more parts to an end fitting without having to remove an entire end fitting from an end of a flexible pipe so as to be able to add or charge a location of a vent path or other such open passage subsequent to an initial installation process.

It is an aim of certain embodiments of the present invention to provide a mechanism for controlling a temperature or temperature profile over time of a fluid retaining layer in a flexible pipe.

It is an aim of certain embodiments of the present invention to provide one or more sensors or observation ports which can be utilised to selectively monitor one or more characteristics of a fluid retaining layer of a flexible pipe.

It is an aim of certain embodiments of the present invention to provide a sealed-off-zone of a fluid retaining layer which can be analysed during use but whereby bore fluid pressure or annulus fluid pressure are not experienced.

According to a first aspect of the present invention there is provided a method of re-terminating an end of a flexible pipe, comprising the steps of:
  removing at least one original end fitting component from a multi-component end fitting, secured to flexible pipe body at an end of a flexible pipe, leaving a retained portion of the end fitting in situ; and
  subsequently securing at least one superseding end fitting component to the retained portion thereby providing a new fluid tight seal against a fluid retaining layer of the flexible pipe at a new sealing location axially displaced from an original sealing location.

Aptly the method further comprises providing the new fluid tight seal by locating an inner seal ring member and/or outer seal ring member against an outer surface of the fluid retaining layer at a new axial position along a length of the flexible pipe body spaced apart from an axial position associated with the original sealing position.

Aptly the method further comprises removing the original end fitting component and subsequently providing the new fluid tight seal without cutting off the multi-component end fitting from a remainder of the flexible pipe by cutting through a whole cross-section of the flexible pipe body.

Aptly the method further comprises removing at least one of a termination portion and/or an inner seal ring member and/or an inner spacer ring member and/or an inner ring insert member.

Aptly the method further comprises removing at least one of an outer spacer ring member and/or an outer seal ring member and/or an outer collar member.

Aptly the method further comprises replacing the at least one original end fitting component with a corresponding replacement component that comprises the superseding component and that has a width dimension greater than or less than a corresponding original width dimension of the original end fitting component.

Aptly the method further comprises replacing the original end fitting component with the replacement component by the steps of:
  unsecuring and then removing the original end fitting component from the retained portion of the end fitting; and
  subsequently locating the replacement component adjacent to the retained portion of the end fitting and directly or indirectly securing the replacement component thereto.

Aptly the method further comprises removing an original termination portion of an end fitting that comprises a posterior end flange from an end of a region of the flexible pipe body together with an inner seal ring member and an inner ring insert member; and
  locating a replacement termination portion having a posterior end flange wider or less wide than the corresponding width of the flange of the original termination portion against a flange of a retained core portion of the end fitting; whereby a replacement inner seal ring member and/or inner ring insert member are located in a recessed region between the replacement termination portion and an outer surface of the fluid retaining layer.

Aptly the method further comprises removing an original termination portion of an end fitting that comprises a posterior end flange from an end of a region of the flexible pipe body together with an inner seal ring member and an inner ring insert member;
  removing an original spacer ring member from a location adjacent to a retained core portion of the end fitting;
  locating a posterior side of a replacement inner spacer ring member having a width more or less wide than a width of the original inner spacer ring member against a flange of a retained core portion of the end fitting;
  locating a termination portion, and inner seal ring member located in a recessed region between said a termination portion and an outer surface of the fluid retaining layer, against an anterior side of the replacement inner spacer ring member; and
  securing the termination portion to the replacement inner spacer ring member.

Aptly the method further comprises unsecuring and then removing an original termination portion of an end fitting, that comprises a posterior end flange, from an end region of the flexible pipe body together with an inner seal ring member and an inner ring insert member;

locating a termination portion comprising the superseding component, and an inner seal ring member in a recessed region between said a termination portion and an outer surface of the fluid retaining layer, against an anterior side of a retained core portion of the end fitting; and
securing the termination portion directly to the core portion.

Aptly the method further comprises cutting a portion off an end of the fluid retaining layer from a remainder of the fluid retaining layer subsequent to removal of the original end fitting component.

Aptly the method further comprises subsequent to the cutting off of said a portion of the fluid retaining layer, determining at least one characteristic associated with said a portion of the fluid retaining layer.

Aptly the fluid retaining layer comprises a barrier layer or liner of the flexible pipe.

Aptly the method further comprises removing an original collar member of an end fitting together with an outer seal ring member and an outer spacer ring member; and
locating a replacement outer spacer ring member having width greater than or less than a corresponding width of the removed outer spacer ring member against a posterior surface of a jacket member of the end fitting; thereby
locating a replacement outer seal ring member in a recessed region between the replacement outer spacer ring member and an outer surface of the fluid retaining layer.

Aptly the method further comprises removing an original collar member of an end fitting together with an outer seal ring member and an outer spacer ring member; and
locating an additional outer spacer ring member against a posterior surface of a jacket member of the end fitting; thereby
locating an outer seal ring member in a recessed region between an outer spacer ring member and an outer surface of the fluid retaining layer, said an outer spacer ring member being spaced apart from the posterior surface of the jacket by the additional outer spacer ring member.

Aptly the fluid retaining layer comprises an outer sheath of the flexible pipe.

According to a second aspect of the present invention there is provided an outer jacket member for an end fitting, comprising:
a generally cylindrical body having an outer surface that provides an outer surface region of an end fitting and an inner surface that defines an extent of a tensile armour wire termination region of the end fitting; wherein
a first end region of the generally cylindrical body comprises at least one securing element for securing the body to a core portion of the end fitting and the inner surface of the generally cylindrical body at a remaining end region of the jacket member, is cylindrical.

Aptly the inner surface of the generally cylindrical body at the remaining end region of the jacket member does not include a tapered region for receiving an outer seal ring member.

Aptly the securing element comprises a threaded region.

According to a third aspect of the present invention there is provided an outer spacer ring member for an end fitting, comprising:
an annular body having a radially inner surface and a radially outer surface spaced apart from the inner surface and first and further, spaced apart, substantially parallel side walls; wherein
the inner surface comprises at least one tapered region for mating with a radially outer facing surface of an outer seal ring member.

Aptly the outer surface comprises a substantially cylindrical surface that provides an outer surface region of the end fitting.

Aptly the inner surface comprises at least two tapered regions each for mating with an associated radially outer facing surface of a respective seal ring member.

According to a fourth aspect of the present invention there is provided an inner space ring member for an end fitting, comprising:
an annular body having a radially inner surface and a radially outer surface spaced apart from the inner surface and first and further, spaced apart, substantially parallel side walls; wherein
the annular body is locatable over an inner fluid retaining layer of a flexible pipe and a radially outer surface of the annular body provides an outer surface region of the end fitting.

Aptly the radially inner surface is substantially cylindrical.

Aptly the radially outer surface is substantially cylindrical.

Aptly the radially inner surface region comprises at least one tapered region for mating with a radially outer facing surface of an inner seal ring member.

Aptly the inner surface comprises at least two tapered regions each for mating with an associated radially outer facing surface of a respective seal ring member.

According to a fifth aspect of the present invention there is provided apparatus for terminating flexible pipe body, comprising:
an end fitting core portion;
an end fitting termination portion; and
a spacer ring member locatable between the core portion and the termination portion for maintaining a whole anterior end surface of the core portion and an opposed whole posterior end surface of the termination portion in a spaced apart relationship.

Aptly the spacer ring member is a ring like body having a radially innermost edge surface and radially outermost edge surface and a posterior side surface, extending between the inner and outer edges, spaced apart from an anterior side surface.

Aptly the radially innermost edge surface and radially outermost edge surface each comprises a respective substantially cylindrical surface.

Aptly the radially innermost edge surface defines a cylindrical surface having a radius that substantially equals a radius of an outer surface of a fluid retaining layer of a flexible pipe terminated at a first end by an end fitting comprising the core portion and termination portion.

Aptly the radially outermost edge surface defines an outer surface that is an external surface of the end fitting.

Aptly the radially innermost surface is substantially cylindrical and includes a plurality of inset regions.

Aptly the anterior side surface is substantially parallel with the posterior side surface of the spacer ring member.

Aptly the anterior side surface extends substantially perpendicular to the radially innermost edge surface and the radially outermost edge surface.

Aptly the posterior edge surface of the spacer ring member is stepped.

Aptly the spacer ring member is a single integral member.

Aptly the spacer ring member is a multi-component member.

Aptly the spacer ring member comprises a cover element at a radially outermost region of the spacer ring member.

Aptly the ring like body is manufactured from a strong and optionally corrosion resistant material.

Aptly the apparatus further comprises at least one heater element and/or cooler element supported in the spacer ring member for controlling a temperature or temperature profile over time of an underlying region of a fluid retaining layer.

Aptly the spacer ring member comprises at least one sensor element locatable against or proximate to an underlying fluid retaining layer.

Aptly the spacer ring member comprises a first sensor element and a further sensor element each arranged to detect motion of an underlying fluid retaining layer in respective orthogonally aligned directions.

Aptly the spacer ring member comprises a test passage that extends from an external test port through a body portion of the spacer ring member, from a radially inner to a radially outer edge surface, to an observation port.

Aptly the spacer ring member comprises a ring-dike body having at least one fluid communication passageway that extends between an outlet port on the radially outermost edge surface of the ring-like body and an inlet port on a posterior side surface and/or anterior side surface of the ring-like body.

Aptly at least a region of the fluid communication passageway is lined or clad or coated with a corrosion resistant liner or corrosion resistant material.

Aptly the inlet port is proximate to a radially innermost edge surface of the spacer ring member.

Aptly the apparatus further comprises at least one circular groove in an anterior side surface and/or posterior side surface of the spacer ring member in fluid communication with the fluid communication passageway.

Aptly the radially innermost edge surface of the spacer ring member comprises at least one recessed region for receiving a respective seal ring member.

Aptly the radially innermost surface at a posterior end of the termination portion comprises a recessed region for receiving a respective seal ring member.

Aptly the radially innermost surface at an anterior end of the core portion comprises a recessed region for receiving a respective seal ring member.

Aptly the radially innermost surface of the spacer ring member is locatable against a fluid retaining layer in a sealed-off-zone between spaced apart sealing locations where a respective bore fluid pressure or annulus fluid pressure is not experienced.

According to a fifth aspect of the present invention there is provided an end fitting comprising apparatus for terminating flexible pipe body, comprising:
an end fitting portion;
an end fitting termination portion; and
a spacer ring member locatable between the core portion and the termination portion for maintaining a whole anterior end surface of the core portion and an opposed whole posterior end surface of the termination portion in a spaced apart relationship.

According a sixth aspect of the present invention there is provided a pull out probe unit, comprising:
at least one sensor element and respective connector secured in a probe body that is locatable in a respective probe body receiving recess of a spacer ring member locatable between a core portion and a termination portion of an end fitting; wherein
the probe body and spacer ring member are substantially full thickness members that extend between a fluid retaining layer of flexible pipe body terminated in the end fitting and an external surface of the end fitting.

According to a seventh aspect of the present invention there is provided a method for terminating flexible pipe body, comprising the steps of:
during a pipe body terminating stage of operation, providing a spacer ring member between a core portion of an end fitting and a termination portion of the end fitting thereby maintaining a whole anterior end surface of the core portion in a spaced apart relationship from an opposed whole posterior end surface of the termination portion.

Aptly the method further comprises the steps of preventing axial motion of a fluid retaining layer of the pipe body with respect to an end fitting by gripping a radially outer surface of the fluid retaining layer via a plurality of inset regions on a radially innermost surface of the spacer ring member.

Aptly the method further comprises the steps of selectively heating and/or cooling a region of a fluid retaining layer underlying the spacer ring member via a respective heating or cooling element supported in the spacer ring member.

Aptly the steps of heating and/or cooling said a region to a predetermined temperature or with a predetermined temperature profile.

Aptly the method further comprises the steps of sensing at least one parameter of a fluid retaining layer underlying the spacer ring member via at least one sensor element supported via the spacer ring member.

Aptly the method further comprises providing a vent path for venting an annulus region of a flexible pipe by locating the spacer ring member, comprising a body including at least one fluid communication passageway, between the termination portion and core portion of an end fitting at a first end region of a flexible pipe.

Aptly the method further comprises providing a fluid communication path for pressurising an annulus region of a flexible pipe by locating a spacer ring member, comprising a body including at least one fluid communication passageway, between the termination portion and core portion of an end fitting at a first end of a flexible pipe; and
applying a non-ambient pressure to the fluid communication passageway.

Aptly the method comprises applying the non-ambient pressure independently of, or either sequentially with, or concurrently with a pressurisation cycle of a bore of the flexible pipe.

Aptly the method comprises applying a non-ambient pressure that exceeds atmospheric pressure when the pipe is tested in air at sea level.

Aptly the method comprises applying a non-ambient pressure that comprises a resultant hydrostatic pressure associated with sea water at a predetermined depth where a region of the flexible pipe is located.

Aptly the method comprises applying the resultant hydrostatic pressure that exceeds atmospheric pressure at sea level directly to a back region of an inner seal ring in the end fitting.

Aptly the method comprises locating the spacer ring member over a fluid retaining layer of a flexible pipe thereby locating at least one posterior facing inlet port, at a first passageway end of the fluid communication passageway, substantially in alignment with a pressure armour layer of the flexible pipe and locating at least one outlet port at a remaining end of the fluid communication passageway at an external surface of the end fitting.

Aptly the method comprises providing a vent valve at the outlet port of the spacer ring member.

Aptly the method comprises the steps of providing a fluid communication pathway between the armour layer and the inner port via a groove in the posterior facing surface of the spacer ring member.

Aptly the method further comprises energising at least one inner seal ring member via the spacer ring member as the spacer ring member is secured between the termination portion and core portion of the end fitting.

Aptly the method comprises energising two spaced apart seal ring members via the spacer ring member as the spacer ring member is secured between the termination portion and core portion of the end fitting.

Aptly the method comprises the steps of providing a sealed-off-zone, where a bore fluid pressure and annulus fluid pressure is not experienced, underlying the spacer ring member subsequent to the spaced apart seal ring members being energised.

Aptly the method further comprises retrofitting the spacer ring member by replacing an original spacer ring member of an end fitting with a new spacer ring member that comprises the fluid communication passageway.

Aptly the step of retrofitting further comprises replacing an original spacer ring member that comprises a blank body with a replacement spacer ring member that comprises the fluid communication passageway.

Aptly the pipe termination stage of operation comprises a stage of re-terminating a pre-terminated segment of flexible pipe body, the method further comprising:

re-sealing against a liner or a barrier layer of the flexible pipe without removing an entire pre-existing end fitting.

Aptly the method further comprises pressurising a bore region of the flexible pipe to a bore pressure; and
pressurising the fluid communication passageway to a further passageway pressure; whereby
the passageway pressure is less than or equal to the bore pressure and greater than atmospheric pressure of air at sea level.

According to an eighth aspect of the present invention there is provided apparatus constructed and arranged substantially as hereinbefore described with reference to the accompanying drawings.

According to a ninth aspect of the present invention there is provided a method substantially as hereinbefore described with reference to the accompanying drawings.

Certain embodiments of the present invention enable one or more component parts of an end fitting at an end of a flexible pipe to be replaced for a variety of reasons without having to refit an entire end fitting which conventionally would involve cutting through a whole cross-section of flexible pipe body and carrying out an entire new termination process.

Certain embodiments of the present invention enable a kit of limited parts including one or more of replacement termination portions of an end fitting and/or outer or inner seal rings and/or ring inserts and/or spacer ring parts to be used over time to re-seal against a barrier layer or liner and/or outer sheath of a flexible pipe at spaced apart axial locations along the length of the pipe. This can be a one off re-termination step or can occur repeatedly.

Certain embodiments of the present invention enable the repeated re-sealing of a barrier layer or liner and/or outer sheath at progressively shorter or longer locations along an axial length of the flexible pipe when a fluid seal fails or when a part of a barrier layer or liner and/or outer sheath is to be inspected.

Certain embodiments of the present invention provide a method and apparatus for providing a vent path for venting an annulus region of a flexible pipe at a desired location subsequent to an initial installation of the end fitting at an end of a segment of flexible pipe body.

Certain embodiments of the present invention provide for a convenient way to retrofit passageways used for fluid communication and/or other purposes at desired locations in an end fitting of a flexible pipe.

Certain embodiments of the present invention provide a technique for grabbing or securing an outer surface of a fluid retaining layer of a flexible pipe body within an end fitting. This helps avoid lateral motion or creep along an axis associated with the flexible pipe body during use.

Certain embodiments of the present invention provide a heater and/or cooler which can selectively be used to control a temperature or provide a temperature profile to a fluid retaining layer. Heating and/or cooling a temperature can help control build-up of solid matter in a bore and help control viscosity of transported fluids.

Certain embodiments of the present invention provide one or more sensors which are locatable against a fluid retaining layer and which can be used to monitor one or more characteristics of the fluid retaining layer constantly or repeatedly.

Certain embodiments of the present invention provide a readily replaceable element of an end fitting which allows observation and/or testing and/or sensing of one or more characteristics of a fluid retaining layer terminated in an end fitting without having to remove and entire end of flexible pipe body and associated end fitting.

Certain embodiments of the present invention will now be described hereinafter, by way of example only, with reference to the accompanying drawings in which:

FIG. 4 illustrates an even more schematic view of the end fitting of FIG. 3a;

FIG. 5 illustrates the end fitting of FIG. 4 with certain replaced components;

FIG. 12b illustrates how back-to-back seals can be energised with a ring insert member;

FIG. 13 illustrates spaced apart sealing rings and a heater element;

Figure 15:
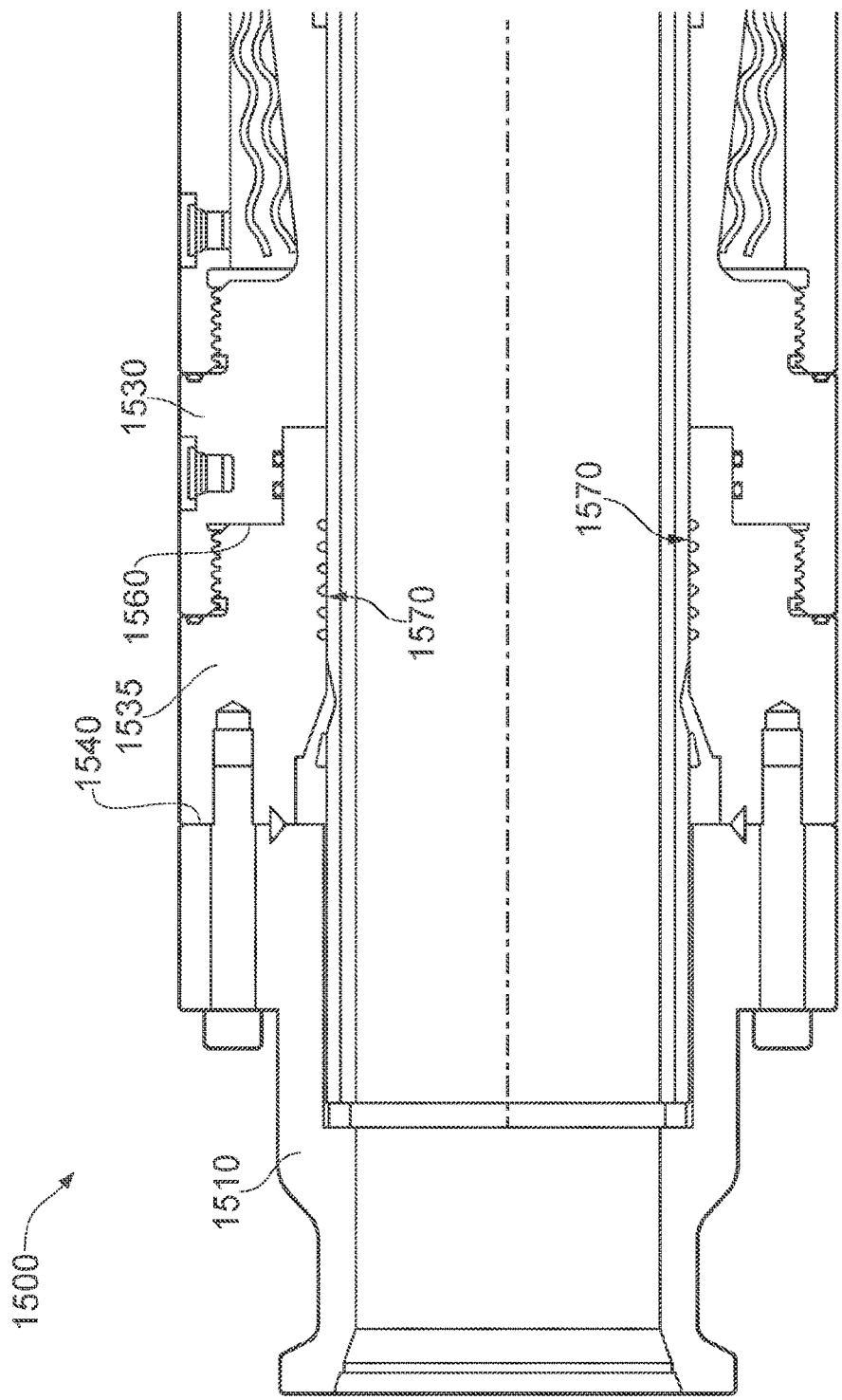
Figure 16:
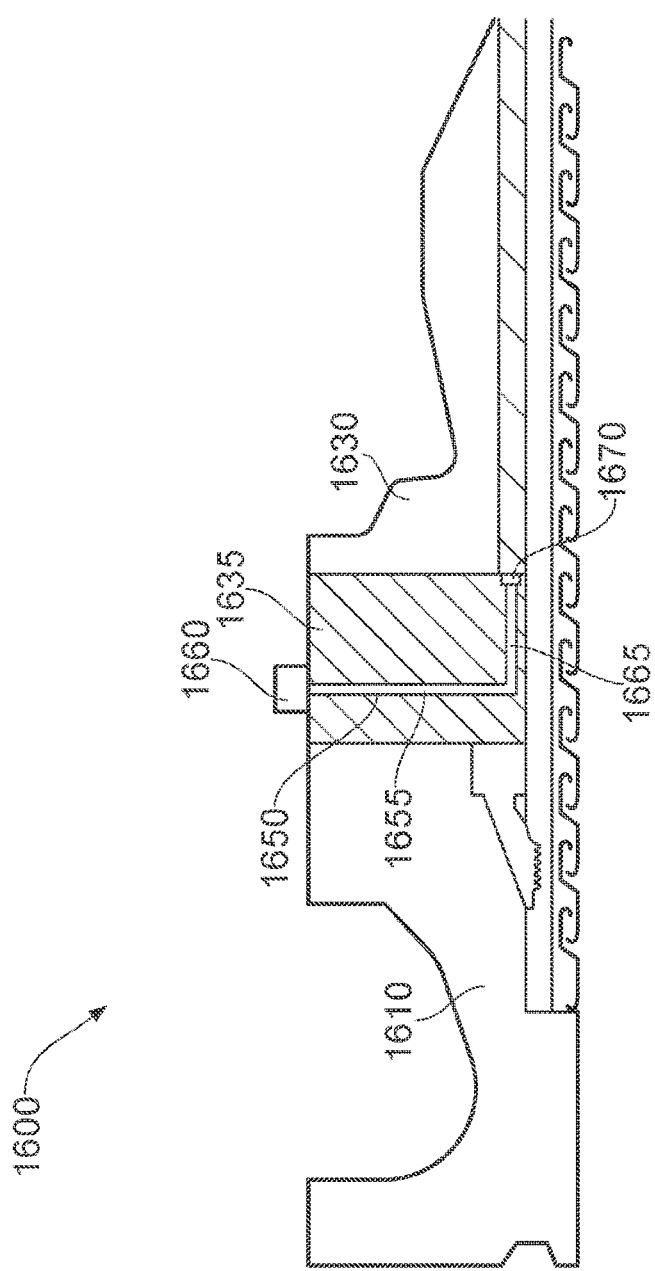

FIG. 15 helps illustrate a spacer ring having non-parallel sides and gripping of a fluid retaining layer;

FIG. 16 helps illustrate the provision of a fluid communication passageway in a spacer ring; and FIG. 17 helps illustrate re-sealing using a replacement spacer ring.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Likewise, and as described in more detail below, certain other embodiments of the present invention are usable with flexible pipe and associated end fittings for flexible pipe of a composite type structure. Such composite type flexible pipe and its manufacture is currently being standardised by the API. Such flexible pipe can include adjacent tubular layers that are bonded together.

Figure 1:
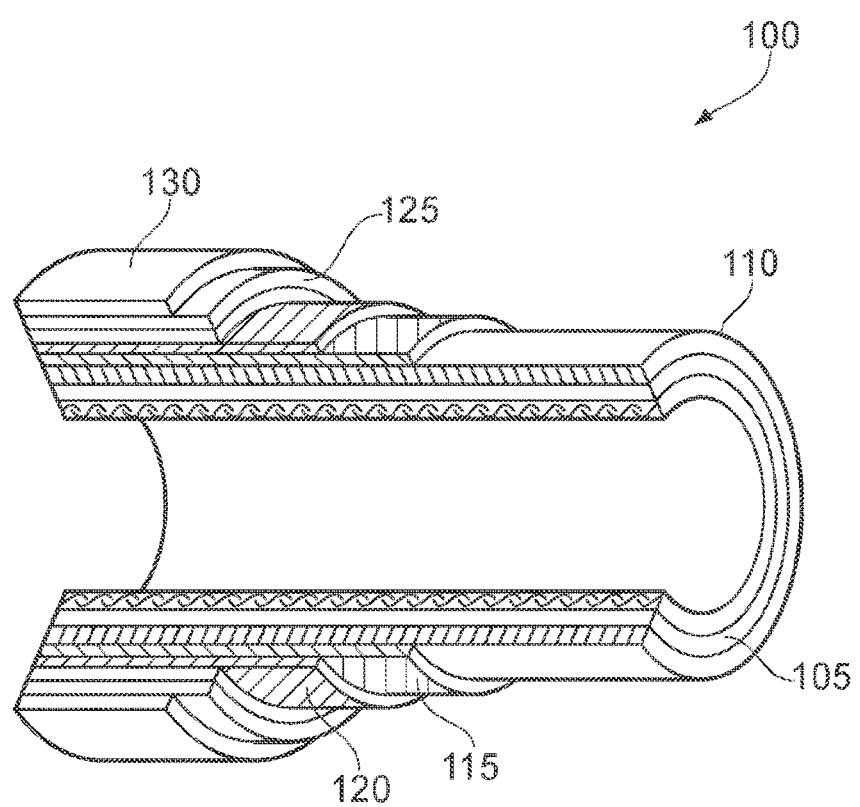
FIG. 1 illustrates flexible pipe body.

Turning to FIG. 1 it will be understood that the illustrated flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres. Certain other possible examples are described herein below.

A tubular composite layer is thus a layer having a generally tubular shape formed of composite material. The layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 105 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 102 is utilised the internal pressure sheath is often referred to by those skilled in the art as a barrier layer. In operation without such a carcass (so-called smooth bore operation) the internal pressure sheath may be referred to as a liner. A barrier layer 105 is illustrated in FIG. 1.

It is noted that a carcass layer where it is used is a pressure resistant layer that provides an interlocked construction that can be used as the innermost layer to prevent, totally or partially, collapse of the internal pressure sheath 105 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials. Aptly the carcass layer can be substituted for a bonded reinforcement layer outside of the internal pressure sheath, which also acts as a pressure armour layer 110.

A pressure armour layer 110 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed from a tubular composite layer. Aptly for unbonded type flexible pipe (not shown) the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition or winding of layers of tape material wherein the layers of pre-impregnated composite tape, or alternate layers of composite tapes and polymer tapes are consolidated and bonded together and also bonded to the internal pressure sheath 105 together forming a bonded pipe body structure.

The flexible pipe body also includes an optional first tensile armour layer 115 and optional second tensile armour layer 120. Each tensile armour layer is used to sustain tensile loads and optionally also internal pressure. Aptly for some flexible pipes the tensile armour windings are of metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape (not shown) which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation 125 and an outer sheath 130, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
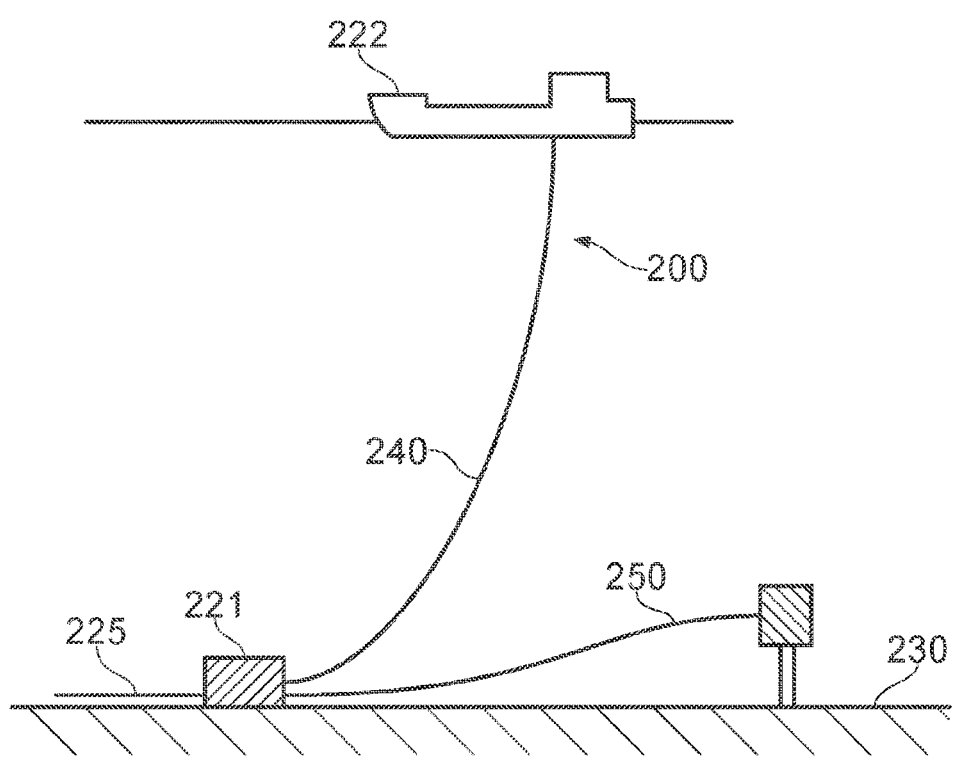
FIG. 2 illustrates uses of flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3A:
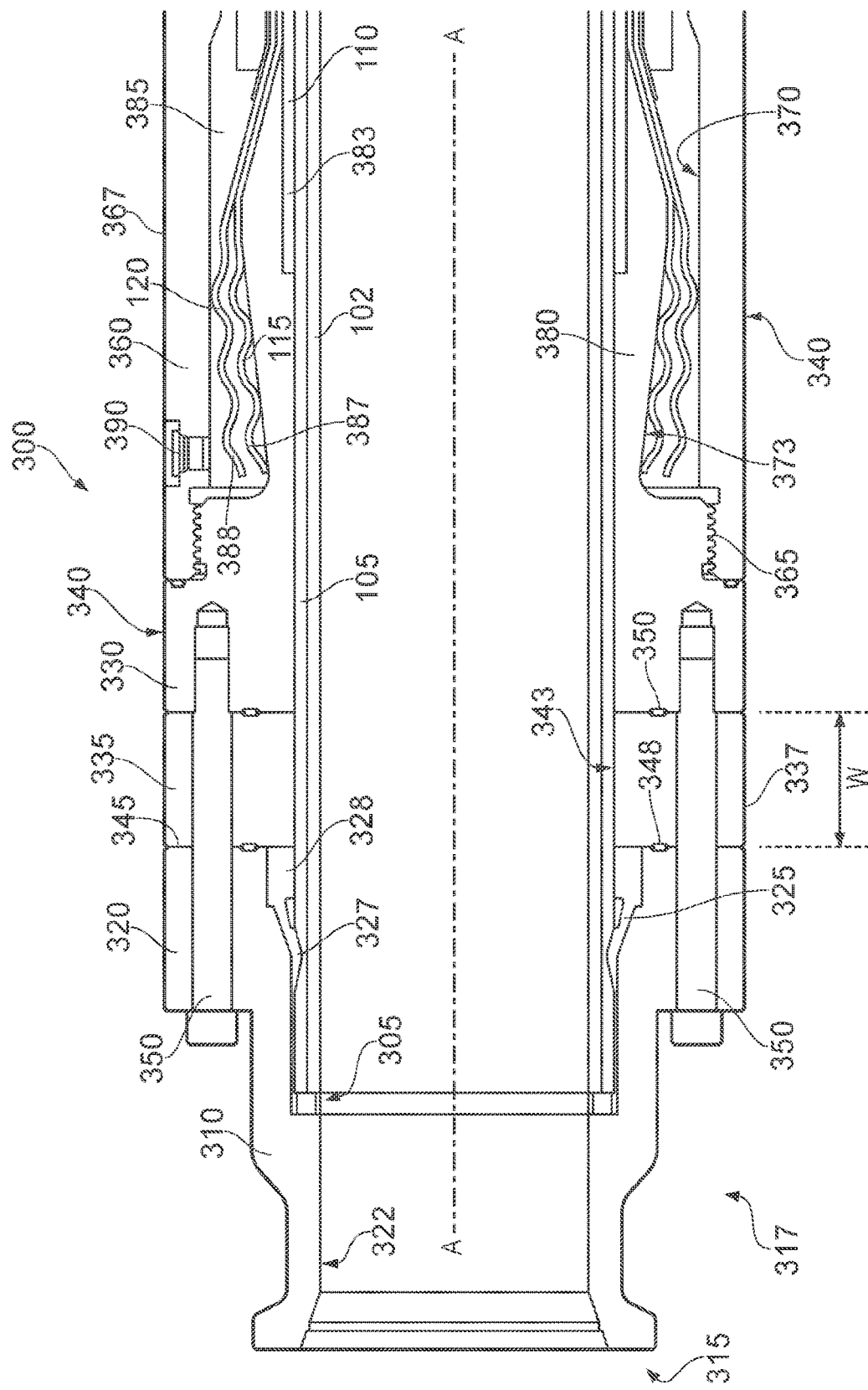
FIG. 3a illustrates parts of a multi-component end fitting.

FIG. 3a illustrates an end fitting 300 which can be utilised to terminate an otherwise open end of the flexible pipe body 100. An end fitting of the type illustrated in FIG. 3 may be secured to both ends of a segment of flexible pipe body or at only one end with a remaining end of the flexible pipe body being terminated in some other manner. The end fitting 300 is a multi-component end fitting. That is to say the end fitting is comprised of many parts each of which serves a particular purpose supporting and/or sealing specific layers of the flexible pipe body.

As illustrated in FIG. 3a a carcass layer 102 and over lying barrier layer 105 share a common end point 305. This end point defines an end extremity at an end region of the flexible pipe body. The end 305 is surrounded and supported by a termination portion 310 of the end fitting. The termination portion 310 itself includes an open end 315, a neck region 317 and an outwardly extending connecting flange 320. The termination portion 310 is made as an integral unit. The open end 315 of the termination portion of the end fitting can be secured to a rigid structure or another end fitting arranged in a back-to-back configuration. The termination portion has an inner surface 322 which has a substantially cylindrical region having an internal diameter that substantially matches an inner diameter of the carcass layer 102 and a flared out region towards the open end of the termination portion which defines an open mouth of the end fitting. Towards the connecting flange 320 of the termination portion the inner surface 322 of the termination portion is first stepped out and then tapered outwards to receive the ends of the carcass layer and barrier layer and to form a recessed region to receive an inner sealing ring 325. The inner seal ring 325 is a sealing member which includes a foot portion 327 that can be energised against a radially outer surface of the barrier layer and an inner seal ring body 328 which moves with the foot portion 327 and which can be urged into the tapered recess region defined between the radially inner surface of the termination portion of the end fitting and the substantially cylindrical outer surface provided by the barrier layer. It will be understood that other designs of inner (or outer) seal ring may also be used, such as a shape comprising trapezoidal or wedge sections which interface with other similarly angled surfaces on the inner (or otherwise opposed) surface 322 or with additional energising rings included in the end fitting design in order to energise the seal. It will also be understood that the inner (or outer) seal ring material may be metallic, polymeric, composite or a combination of these, without compromising the ability to enable the seal.

The termination portion 310 of the multi-component end fitting is secured to a core portion 330 of the end fitting 300 via an interposed spacer ring 335. The spacer ring 335 is a ring-like member that has a substantially cylindrical outer surface 337 that forms part of an overall outer surface 340 of the end fitting 300 and a substantially cylindrical radially inner surface 343 which has an inner diameter that substantially matches the dimensions of the outer surface of the fluid retaining barrier layer 105. The spacer ring member 335 thus supports the fluid retaining barrier layer which underlies the spacer ring in use. A first and further side of the spacer ring are substantially parallel and extend between the radially outer surface 337 and radially inner surface 343 of the spacer ring. The sides are substantially parallel and spaced apart. The sides are spaced apart by a width W. A first side 345 of the intermediate spacer ring is opposed to and abuts with an end surface of the connecting flange 320 of the termination portion 310. This end of the termination portion is referred to as a posterior end whilst the first side surface 345 of the spacer ring is referred to as an anterior surface. That is to say for the purpose of explanation only a posterior surface faces towards the right hand side of the figure whilst an anterior surface faces towards the left hand side of a figure. It will be appreciated that this reference system is used for illustration only and that anterior or posterior will be relative to an actual arrangement of end fitting and flexible pipe body in use. The anterior surface of the spacer ring shown in FIG. 3 is sealed to the posterior surface of the termination portion of the end fitting 300 via a respective O-ring seal 348. A posterior surface provided by another side of the intermediate spacer ring member 335 abuts with an opposed anterior end surface of the core portion 330 of the end fitting and a respective O-ring seal 350 seals this interface. The O-ring seals 348 and 350 may be O-rings or metallic, elastomeric or polymeric gasket rings of designs familiar to those skilled in the art. Other seal types could of course be utilised.

As illustrated in FIG. 3 the termination portion 310 of the end fitting 300 is secured to the core portion 330 via the spacer ring member using one or more bolts 350. It will be appreciated that other securing mechanisms could of course be utilised. The termination portion, core portion, spacer ring member, seal ring and O-rings are examples of components of an end fitting.

An outer casing 360, referred to as a jacket, is a substantially cylindrical element which is secured to the core portion 330 of the end fitting. As illustrated in FIG. 3 the jacket 360 is secured to the core portion via mating threads 365. Other securing mechanisms could of course be utilised. A substantially cylindrical outer surface 367 of the jacket 360 forms part of the outer surface 340 of the end fitting 300. A radially inner surface 370 of the jacket is spaced apart from a radially outer surface 373 of a neck 380 of the core portion 330 of the end fitting 300. An inner surface of the neck has a region having an interior dimension that matches the radially outer surface of the barrier layer together with a step to receive an end 383 of the pressure armour layer 110.

The radially outer surface of the neck 380 of the core portion 330 is thus spaced apart from the radially inner surface 370 of the jacket 360 to define an enclosure 385 therebetween. This enclosure is a chamber or space where ends 387, 388 of respective tensile armour windings 115, 120 can be terminated. The enclosure 385 may be filled with epoxy via an access port 390 during a termination process to fix the ends of the tensile armour windings in place.

FIG. 4 illustrates selected parts of the end fitting 300 shown in FIG. 3 in more detail. Much of the end fitting illustrated in FIG. 3 is omitted in FIG. 4 for the sake of clarity. FIG. 4 helps illustrate how a width W of the spacer ring member 335 is a dimension that can be selected to determine how far the core portion 330 and termination portion 310 of the end fitting 300 are spaced apart. As the termination portion is secured to the core portion via the spacer ring member during a flexible pipe end fitting termination process the spacer ring member energises the inner seal ring 325 against the radially outer surface of the barrier layer 105. The width W is a dimension that thus sets an original sealing position 400 in terms of the axial direction. That is to say in terms of a relative position extending axially parallel with the central axis A-A associated with the central bore of the flexible pipe body in the end fitting.

FIG. 5 helps illustrate how an end fitting component (in FIG. 5 the spacer ring member) can be removed from a multi-component end fitting and be replaced by a corresponding end fitting component that has a dimension (in FIG. 5 a width) different from the original component. In more detail, in the example shown in FIG. 5, the core portion 330 and underlying pressure armour layer 110 remain in place as a retained portion of the end fitting but the termination portion 310 has been removed together with an original inner seal ring and original spacer ring. This removal step reveals the end 305 of the barrier layer 105 and underlying carcass layer 102. A short section of the barrier layer and carcass layer has then been removed via a further step by cutting through the barrier layer and carcass layer and then the original termination portion 310 or a similar replacement and either the original inner sealing ring or a replacement inner sealing ring has again been secured to the core portion 330. However in FIG. 5 a new spacer ring member having a width different from the original spacer ring has been located between the core portion and termination portion in a step of the re-termination process. As a result when the sealing ring is energised against the fluid retaining layer this occurs at a new sealing location 500 which is axially displaced from an original sealing location 400. This ability to reseal against a liner or barrier layer is helpful as it means an initial faulty seal can be corrected without having to replace an entire end fitting and/or allows a portion of a barrier layer and carcass layer to be removed after being used so that the removed part can be investigated for monitoring purposes. Analysis can occur without having to carry out a conventional re-termination process which would involve cutting off the whole end fitting, thus shortening the flexible pipe and re-fitting a whole new end lifting. It will be understood that depending on the geometry and dimensions of the termination portion 310 it may not be necessary to cut back the barrier and carcass layers of the flexible pipe body in order to relocate the inner seal ring 325.

Figure 3B:
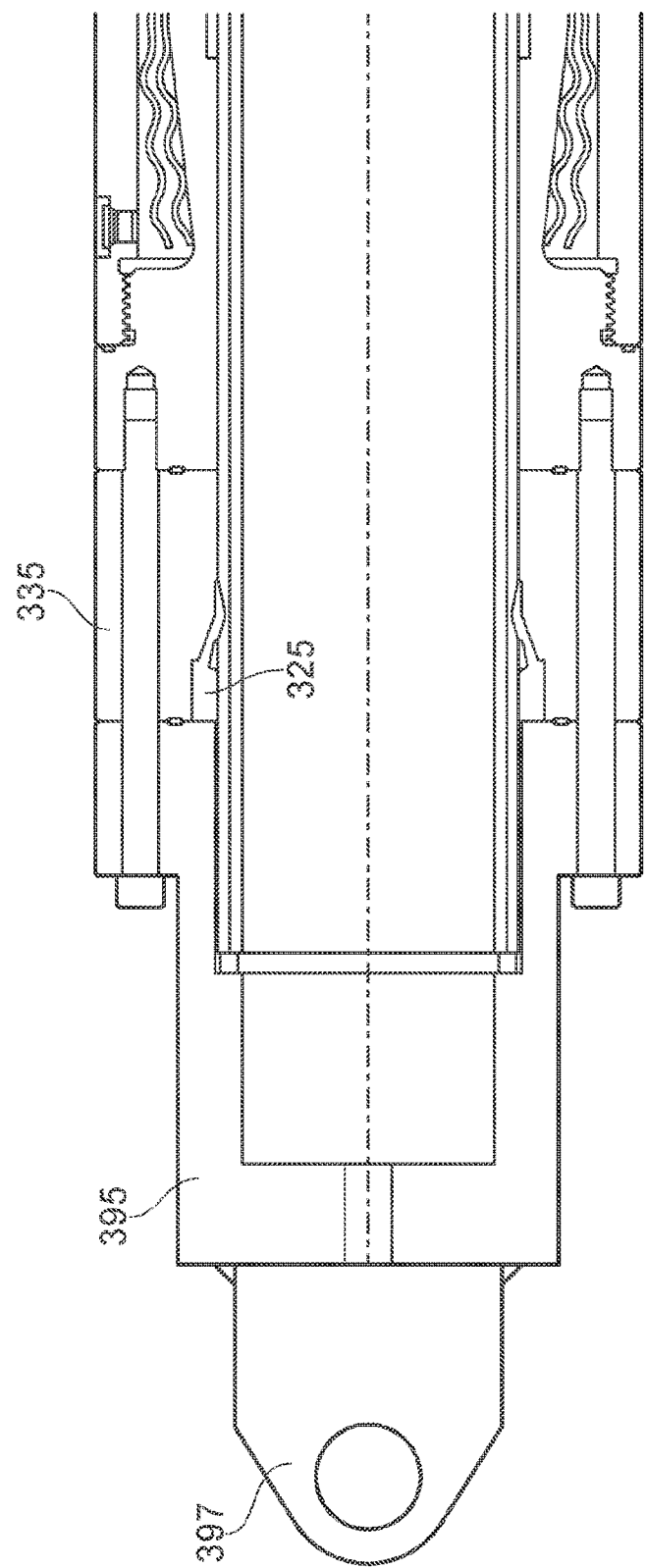
FIG. 3b illustrates a multi-component end fitting with a pad eye end cap, spacer ring and associated seal ring.

It will be likewise appreciated by those skilled in the art that a separate type of connector end may be initially attached in place of the open flanged end connector 310; this alternative arrangement may be assembled with or without the inner seal ring 325 energised. This alternative type of end connector provides a termination portion that may be an installation end cap 395 incorporating a pad-eye 397 to receive tensioning/hanging equipment (shackles, chains, slings/ropes etc.) which is used to install a pipe subsea, transferring tension loads from the installation equipment to the pipe. This is illustrated in FIG. 3b. Once the pipe is installed to the required position the installation end cap is removed and the flange end termination portion 310 is installed along with the energisation of the inner seal ring 325. If the inner seal ring 325 is energised against the spacer ring 335 as illustrated in FIG. 3b it may not be necessary to replace or energise this seal later when the installation end cap is replaced with the flanged end connector 310.

FIGS. 3a, 3b, 4 and 5 thus illustrate how original end fitting components such as a termination portion 310, inner seal ring member 325 and spacer ring member 355 can be removed from a multi-component end fitting leaving a retained portion of the end fitting in situ. Subsequently superseding end fitting components (a superseding termination portion 310, superseding inner seal ring member 325 and superseding spacer ring member 335) can be secured to the retained portion thus providing a new fluid tight seal against a fluid retaining layer at a new sealing location. The new sealing location is axially displaced from an original sealing location. In the previous described embodiment the superseding components for the termination portion and inner seal ring member can merely involve the re-use of the original parts. Alternatively new previously unused parts having identical size and shape dimensions could of course be utilised. The superseding spacer ring member however has a different shape and size configuration from that original component part which has been removed.

Figure 6:
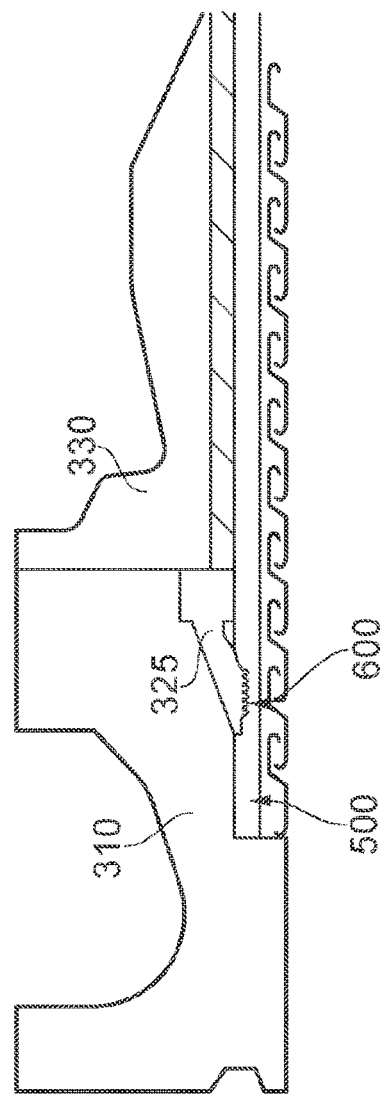
FIG. 6 illustrates a component part being removed.

FIG. 6 helps illustrate how instead of removing one or more end fitting components and replacing each removed component with a corresponding replacement component it is possible, according to certain embodiments of the present invention, to remove and not replace an end fitting component. In more detail FIG. 6 helps illustrate how during a further re-termination of an end of the flexible pipe the termination portion 310 and inner seal ring member can be removed together with the spacer ring member 535 illustrated in FIG. 5. The termination portion 310 and inner seal ring are then re-fitted by securing these directly to the retained core portion 330. As a result a new fluid tight seal is again provided against the fluid retaining layer of the flexible pipe. Again this can be achieved by cutting off a short end section of the barrier layer and carcass layer. The new sealing location 600 is shown offset from the location where the earlier sealing location 500 made with respect to the reduced width spacer ring member 535 shown in FIG. 5 is made. It will be appreciated that it would be possible during a re-termination process to merely remove the original spacer ring member 335 illustrated in FIG. 4 and cuts off a slightly longer section of barrier layer and carcass layer to enable the termination portion 310 to thereafter be secured directly against the core portion 330 as per FIG. 6. Thus a superseding end fitting component may be an entirely new component part or may be a reused component part. Likewise one or more component parts may be omitted entirely during a re-termination process rather than changing a dimension of a component part.

It will likewise be appreciated by those skilled in the art that rather than reducing a width of an intermediate spacer ring as part of successive re-termination processes wider intermediate spacer ring members may progressively be introduced. This would have a net result of again providing a new fluid tight seal against a fluid retaining layer of a flexible pipe at a new sealing location axially displaced from a preceding sealing location. Re-termination in this manner would of course require a longer free length of barrier layer and carcass layer to be originally provided in a termination portion in the expectation that subsequent re-termination processes would move progressive sealing inner seal ring members away from the core portion 330 of an end fitting as opposed to moving the searing point nearer to the core portion as described in detail in FIGS. 4, 5 and 6.

Figure 7:
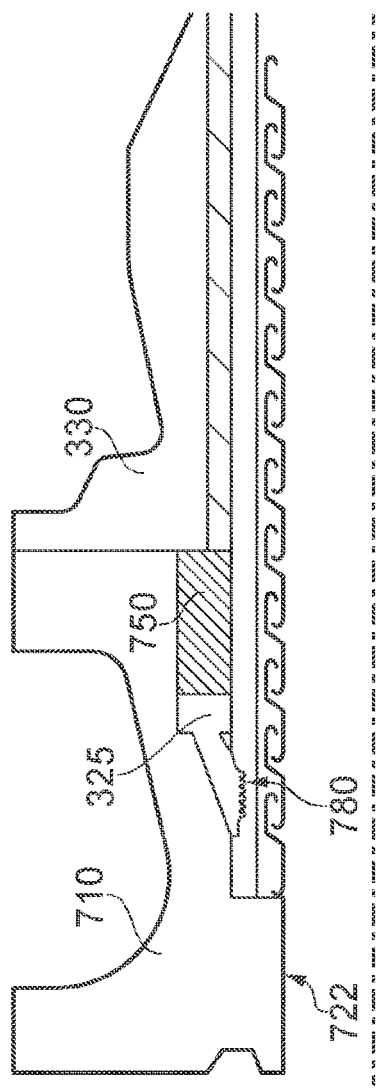
FIG. 7 illustrates parts of a multi-component end fitting.

FIG. 7 helps illustrate an alternative re-termination process for an end of a flexible pipe. In many respects the end fitting illustrated is similar to that described with respect to FIGS. 3 to 6 however the termination portion 710 has an inner surface 722 which is substantially cylindrical towards an open end of the end fitting, stepped out to receive ends of the barrier layer and carcass layer then tapered to receive a foot portion of the inner seal ring member 325. The inner surface 722 also then ends in a substantially cylindrical section in which a ring insert 750 is located. The ring insert is an example of a component of the end fitting. The inner surface 722 of the termination portion 710 illustrated in FIG. 7 thus defines a recess between the termination portion 710 and the substantially cylindrical outer surface of the barrier layer. The body of the inner seal ring member 325 and the ring insert member 750 are located in this recessed region. During a termination process the termination portion 710 of the end fitting and core portion 330 of the end fitting are secured together. As this securing action occurs the anterior surface of the core portion 330 is driven against a posterior surface of the ring insert member 750. This urging motion energises the inner seal ring member 325 against the outer surface of the barrier layer. As a result an original sealing location 780 is defined at an axial location along the length of the barrier layer of the flexible pipe.

Figure 8:
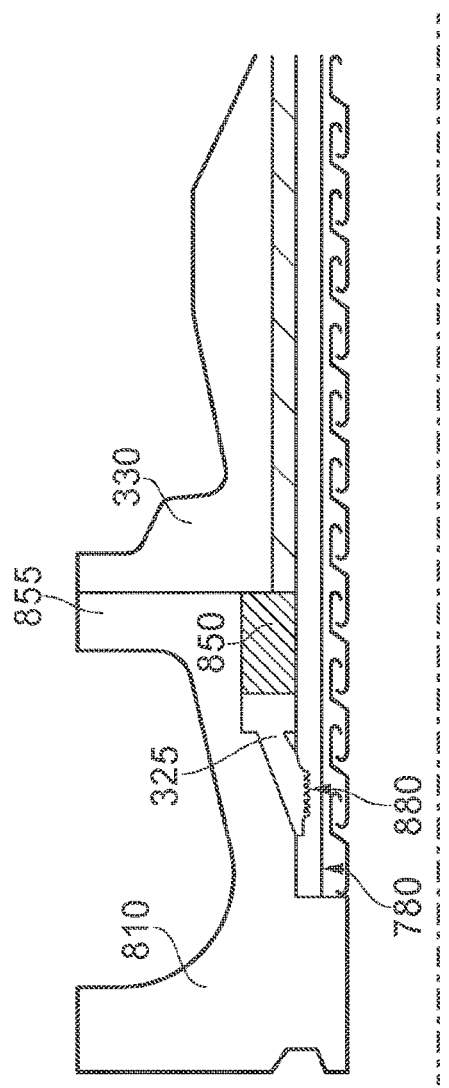
FIG. 8 illustrates the end fitting of FIG. 7 with certain replaced components.

FIG. 8 helps illustrate how a re-termination of an end of the flexible pipe shown in FIG. 7 can be carried out. During the method of re-terminating the end of the flexible pipe the termination portion 710 and inner seal ring member 325 are removed together with the ring insert member 750. Remaining components of the original end fitting are retained in situ so that the terminated ends of the tensile armour windings are unaffected by the removal of the end fitting component parts. As illustrated in FIG. 8 a superseding termination portion 810 and superseding inner seal ring member 325 are utilised together with a superseding ring insert member 850. It will be appreciated that the superseding inner seal ring member 325 may be a reused component that has just been removed or may be a new component part having dimensions substantially matching the removed component parts. On the other hand the new ring insert member 850 has a width that is reduced with respect to a corresponding width dimension of the ring insert member 750 illustrated in FIG. 7. Likewise the termination portion 810 has a connecting flange 855 that has a width reduced relative to the width of the connecting flange of the removed termination portion 710.

During a re-termination process the original termination portion and inner seal ring member and original ring insert member 750 are removed and an end section of the barrier layer and carcass layer may be cut off. The ends of the carcass and barrier layer are revealed when the termination portion, inner seal ring member and ring insert member are removed from the retained portion of the end fitting. After cutting the barrier layer and carcass layer to a suitable length the replacement termination portion 810 is secured to the core portion 330 using bolts or some other suitable securing mechanism thus superseding the original component. As an anterior surface of the core portion 330 contacts the posterior surface of this superseding termination portion the new ring insert member 850 energises the inner seal ring member against an outer surface of the barrier layer at a new sealing location 880. This new sealing location 880 is displaced in an axial direction from a location on the barrier layer where an original sealing location occurs.

Figure 9:
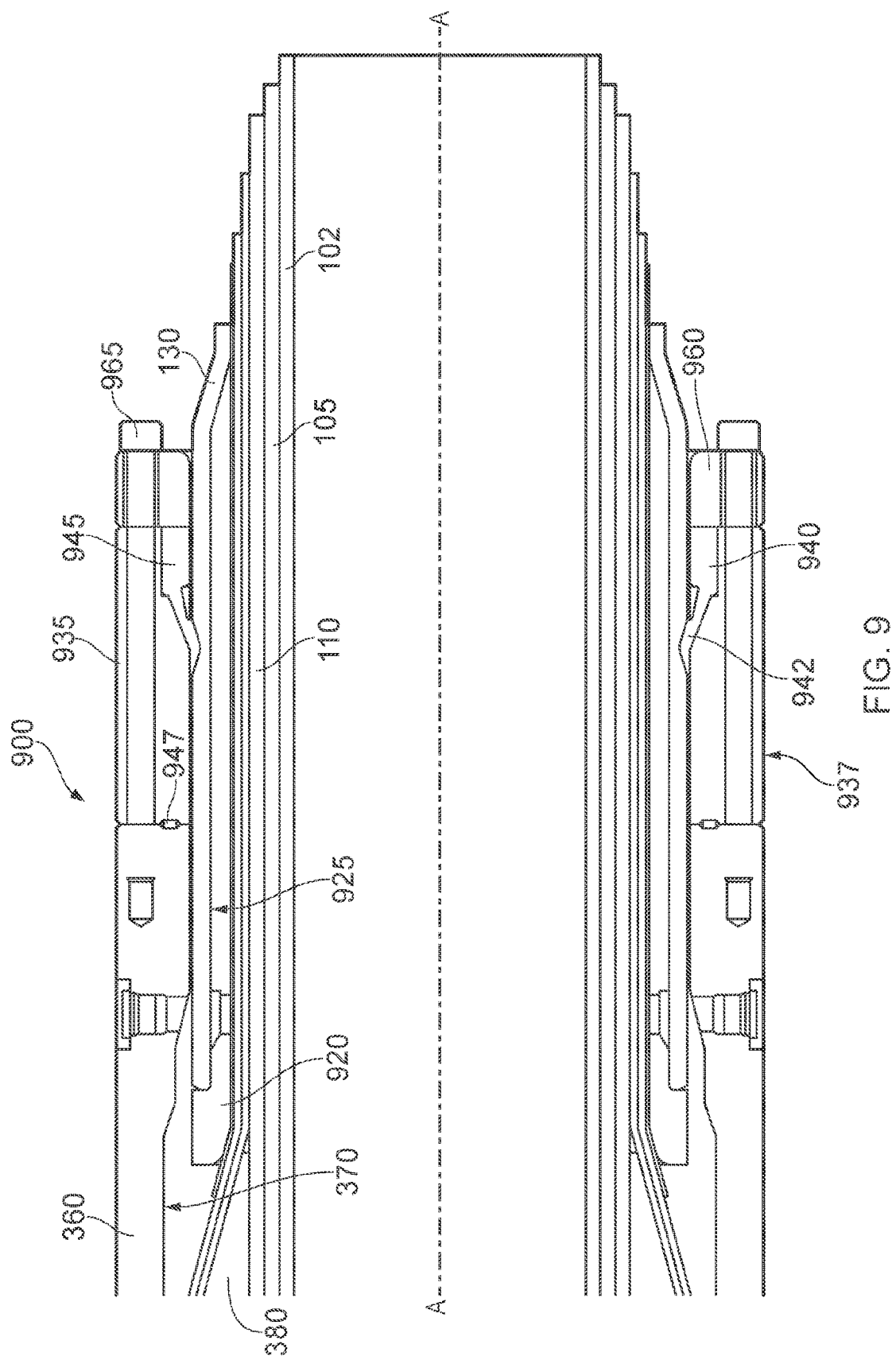
FIG. 9 illustrates parts of a multi-component end fitting.

FIG. 9 helps illustrate how a re-termination process can occur for an end of a flexible pipe in which a new fluid tight seal is formed against an outer sheath 130 of the flexible pipe. It will thus be appreciated that certain embodiments of the present invention enable the resealing of an inner fluid retaining layer or an outer fluid retaining layer or indeed both an outer and an inner fluid retaining layer. It will also be appreciated that certain embodiments of the present invention can also be utilised to reseal against an intermediate fluid retaining layer located between a barrier layer or liner and an outer sheath.

As illustrated in FIG. 9 the outer sheath 130 of the flexible pipe body is terminated at an end of an end fitting not shown in previous FIGS. 3 to 8. As illustrated in FIG. 9 a posterior end of the jacket 360 at this further end of the end fitting has an inner surface 370 which is tapered to be partially closed but the jacket 360 itself has an end 900 which remains open. An inner surface 910 at the posterior end of the jacket 360 defines a substantially cylindrical surface which is spaced apart from an outer surface provided by an outermost layer of tensile armour windings. An inner collar member 920 is urged between the outer surface of the outermost tensile armour winding layer and an inner surface 925 of the outer sheath 130. An outer spacer ring 935 is a substantially ring-like member that has a substantially cylindrical outer surface 937 which forms part of the outer surface of the end fitting together with a radially inner most surface that includes a substantially cylindrical portion and a tapered and reset region. The substantially cylindrical portion of the outer spacer ring member has a dimension that substantially matches the dimension of the outer surface of the outer sheath. The tapered region of the inner surface of the outer spacer ring member 935 defines a recess in which an outer seal ring 940 can be located. The outer seal ring is a member 940 that includes a foot portion 942 and a body portion 945. The foot portion 942 of the outer seal ring member 940 is urged against the outer surface of the outer sheath 130 when the outer seal ring member is energised thus forming a fluid seal. The outer spacer ring member has an anterior surface which is secured to a posterior surface of the jacket and sealed via a respective O-ring 947. Other sealing mechanisms could of course be used. An anterior end surface of the outer spacer ring member 935 abuts with an anterior surface of a collar 960. As part of a termination process the collar is secured indirectly to the end of the jacket via the intermediate spacer ring member using bolts 965 or other such securing mechanism.

Figure 10:
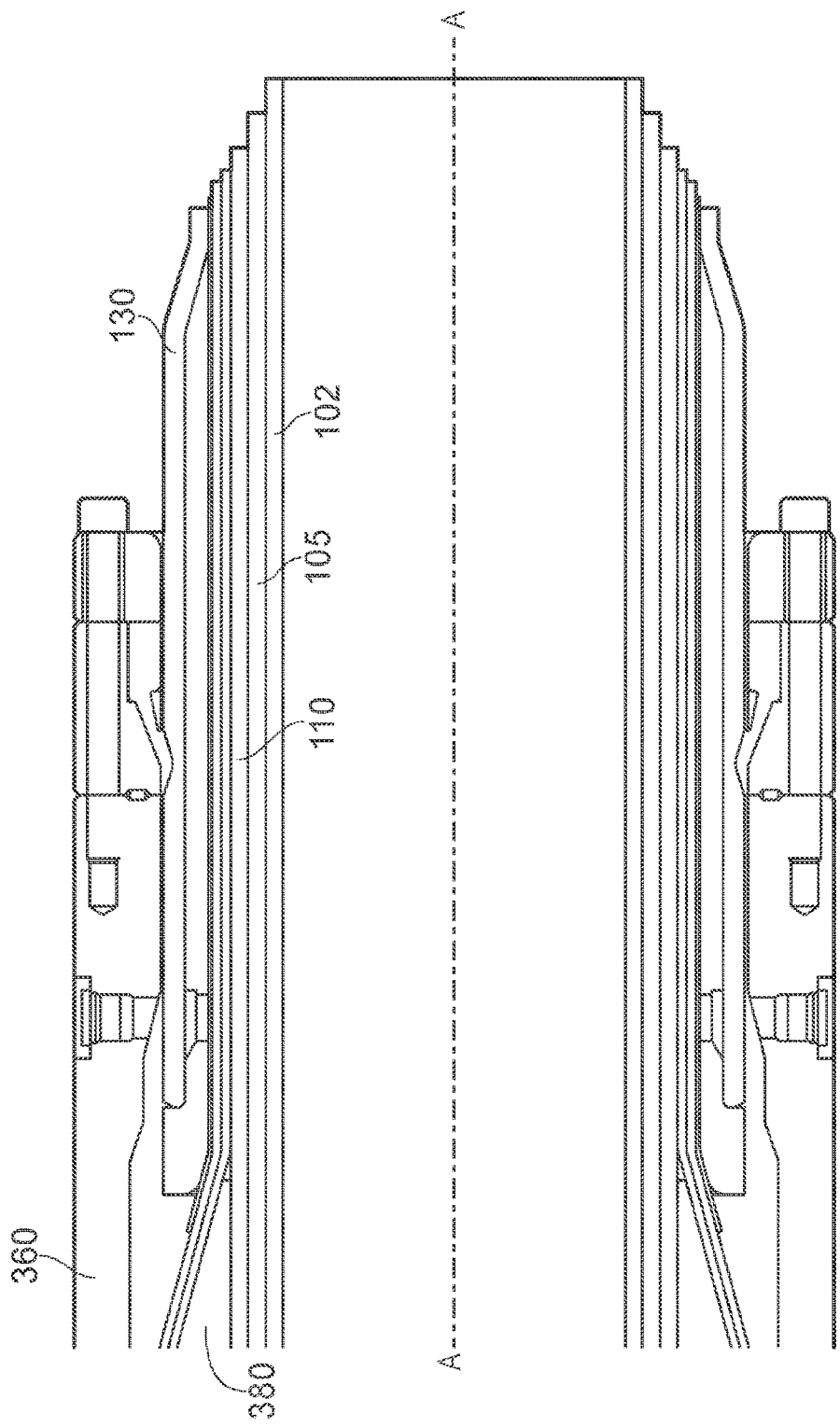
FIG. 10 illustrates the end fitting of FIG. 9 with replaced components.

FIG. 10 helps illustrate how, as part of a re-termination process, the outer spacer ring member can be removed and then replaced by another outer spacer ring member having a width that is smaller than a corresponding width of the preceding outer spacer ring member. As illustrated in FIG. 10 a width of the replacement outer spacer ring member can be as little as the width of an outer seal ring member which is used to seal against the outer sheath 130 of the flexible pipe. It will be appreciated that re-terminating the seal of the outer sheath of a flexible pipe whilst leaving the retained portion of the end fitting in situ is complicated by the fact that the collar and outer spacer ring member must be slid down a whole length of the flexible pipe body to a free end to remove those component parts and then new component parts slid along a length of the flexible pipe body. As an alternative it will be appreciated that the outer spacer ring member can be formed as a split ring element as can the collar member. Alternatively the collar member and/or outer spacer ring member can be formed as multiple ring-like elements. When a re-termination process is desired the multiple components are unsecured from a retained portion of the end fitting and undesired parts can be destructively removed leaving pre-existing outer spacer ring member elements or at least one outer spacer ring member element and at least one outer collar member intact to be secured again to an end of the jacket 360 by new, suitably shortened bolts. The outer sheath can be heat treated to mend any grazes or cuts that occur as components are removed.

It will be appreciated that whilst FIGS. 9 and 10 have been described in terms of shortening a width of an outer spacer ring member to form a new sealing location a new sealing location could be formed by increasing a width of the outer spacer ring member. This is achieved either by sliding new component parts along a whole length of the flexible pipe body from a free end of the flexible pipe or by relaxing the securing mechanisms and securing in one or more new split ring elements in place to act as spacers.

Figure 11:
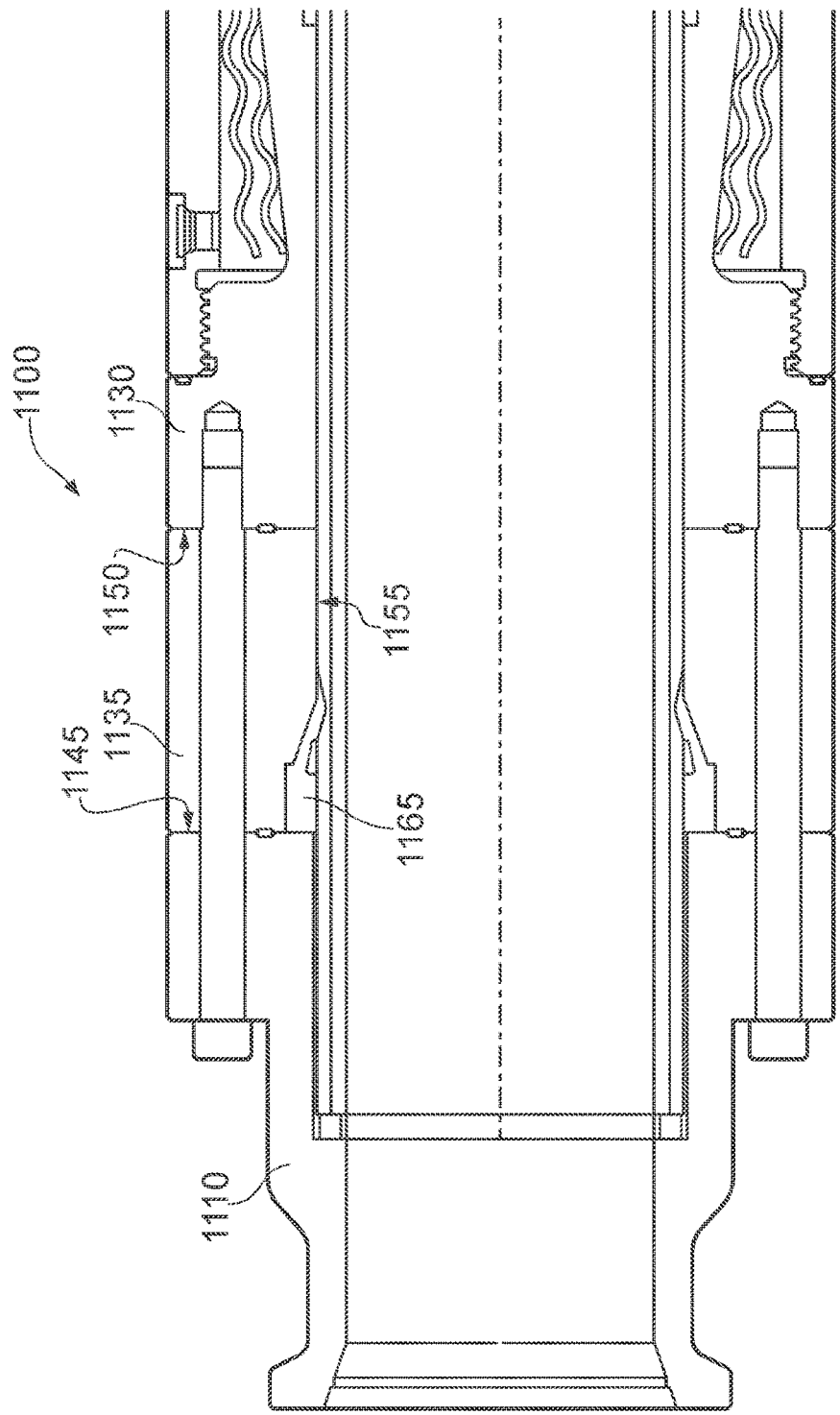
FIG. 11 illustrates providing a fluid seal using a spacer ring and associated seal ring.

FIG. 11 illustrates how a multi-component end fitting 1100 can be provided with a termination portion 1110 and a core portion 1130. A spacer ring 1135 is interposed between a posterior end surface 1145 of the termination portion 1110 and an anterior surface 1150 of a core portion of the end fitting. An anterior side surface of the spacer ring abuts with the posterior side surface of the termination portion. The spacer ring 1135 ensures that a whole surface of the posterior end of the termination portion is held in a spaced apart relationship from a whole surface of the anterior surface of the core portion. That is to say the width of the body of the intermediate spacer ring separates the core portion from the termination portion. In FIG. 11 and the previous Figures this width is substantially constant but this is optionally not always the case. As illustrated in FIG. 11 the radially innermost edge surface 1155 of the seal ring member 1135 has a substantially cylindrical nature including a smooth cylindrical region towards a posterior end of the spacer ring 1135 whilst the inner edge 1155 tapers out towards an anterior end of the spacer ring. The radially innermost surface of the spacer ring defines a recess between the spacer ring and barrier layer where an inner seal ring 1165 is located. That is to say the intermediate spacer ring 1135 can include one or more recessed regions to receive respective seal rings. One of these is illustrated in FIG. 11.

Figure 12A:
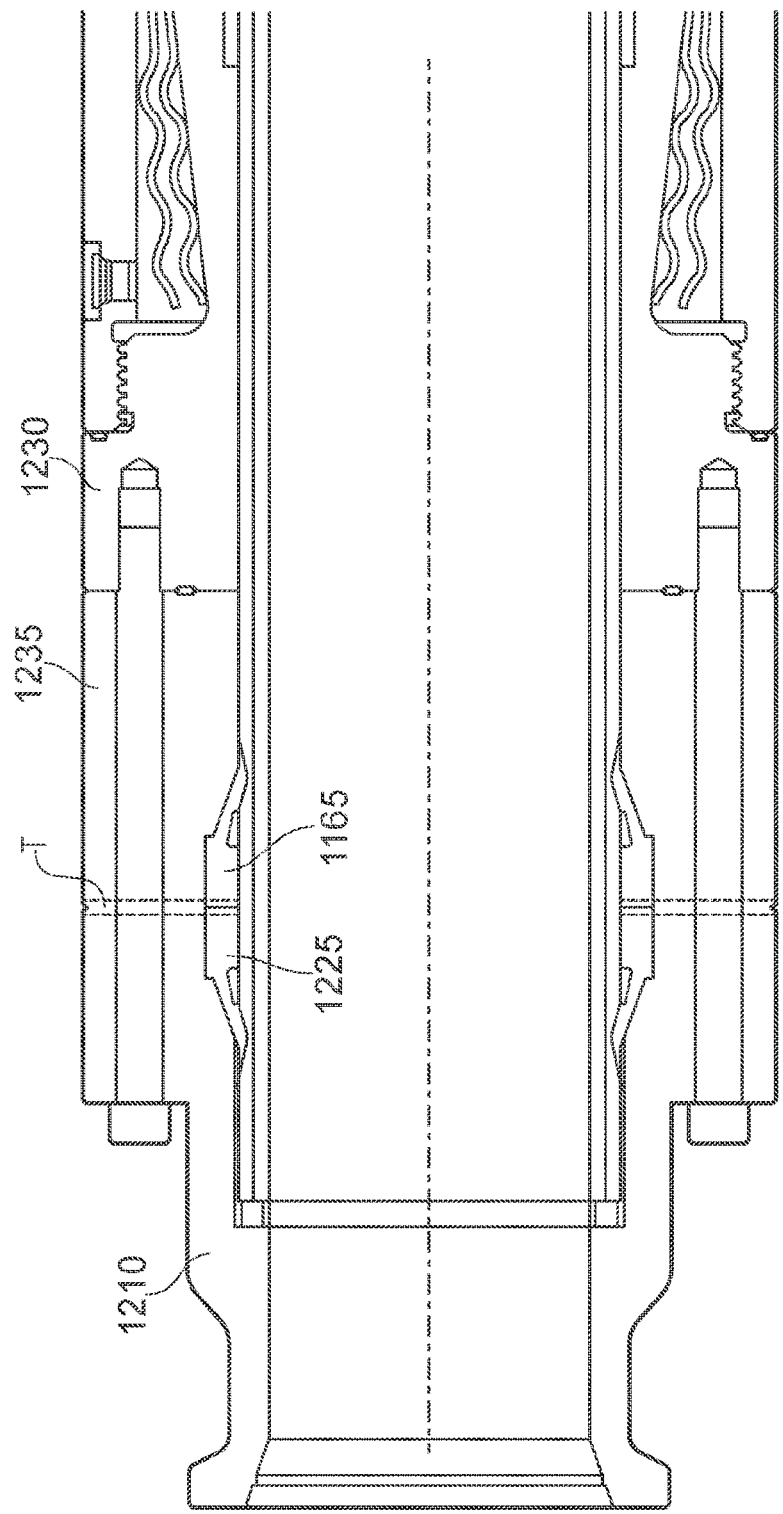
FIG. 12a illustrates how back-to-back seal rings may be provided.

FIG. 12a illustrates an alternative arrangement to that shown in FIG. 11 whereby in addition to a recess for a seal ring 1165 the termination portion 1210 can likewise include a recessed region for receiving a respective seal ring 1225. The seal ring 1225 that provides a seal between the termination portion and the outer surface of the fluid retaining layer provides a seal so that bore fluid pressure is not communicated to a location between the back-to-back seal rings. By contrast the seal ring 1165 supported and energised by the intermediate spacer ring provides a seal to prevent annulus fluid pressure being experienced at a location between the back-to-back seal rings. It will be appreciated that a fluid communication port (T) can be provided and this is in fluid communication with a location between the back-to-back seal rings. This port provides a local opening up of the joint between the termination portion 1210 and the intermediate spacer ring 1235, and can be used to ensure external hydrostatic pressure is conveyed to the location between the back-to-back seal rings.

FIG. 12a thus helps illustrate how a double seal arrangement can be utilised. The back-to-back seal arrangement helps provide a first seal location which seals the bore together with a spaced apart further seal location which acts as a back-up seal as well as sealing off the annulus from the part or parts forming the seal at the first seal location. It will be appreciated that a single ring like seal (i.e. one integral unit) including opposed seal elements can be utilised according to certain embodiments of the present invention.

In FIG. 12a the intermediate spacer ring 1235 is secured between a posterior surface of the termination portion 1210 of the end fitting and an anterior surface of the core portion.

FIG. 12b helps illustrate how certain embodiments of the present invention can utilise a ring insert rather than a spacer ring to energise two back-to-back seal rings (or a single integrally formed seal ring that seals at two spaced apart locations).

As shown in FIG. 12b a termination portion 1240 of the end fitting is secured directly against an anterior surface of a core portion 1250. A first seal ring 1260 provides a bore seal whilst an adjacent seal ring 1265 helps provide a back-up seal to stop the annulus receiving the bore pressure and helps seal the annulus off from the bore seal. A ring insert 1270 is driven into a recessed region within the termination portion by the core portion and termination portion being driven/urged together. This energises the seal elements. Spaced apart 'O'-ring seals 1280, 1285 help seal off the fluid route to the annulus.

A test port 1287 is shown connected to a location between seal locations against the fluid retaining layer via a passageway 1290. Likewise a further test port 1292 is connected to a location between the spaced apart 'O'-ring seals via a respective passageway 1294. This allows the seals to be tested as well as providing the possibility for points between the seal rings to experience a local hydrostatic pressure in use by flooding the test port 1287 and passageway 1290.

FIG. 13 illustrates an alternative arrangement in which back-to-back seal rings 1325, 1365 can be utilised in a multi-component end fitting. In this embodiment neither of the seal rings are supported within the intermediate spacer ring. Rather a first seal ring 1325 which seals against bore fluid pressure is formed in a recess between the termination portion of the end fitting and the fluid retaining layer. Annulus fluid pressure and annulus fluid generally is sealed via the sealing ring 1365 formed in a recess between the core portion and the outer surface of the fluid retaining layer. Use of two spaced apart seal rings in this manner creates a sealed-off-zone where a respective bore fluid pressure or annulus fluid pressure is not experienced. In FIG. 13 this zone is located at the interface between the intermediate spacer ring and the outer surface of the fluid communicating layer.

FIG. 13 also helps illustrate how a heater element 1370 can be supported in the intermediate spacer ring. It will be appreciated that rather than the heater element 1370 or indeed in addition to it one or more cooling elements may likewise be embedded or otherwise supported in the spacer ring. The heaters or coolers are supplied with power or heated or cooled fluid via conventional techniques. The heater element 1370 (or indeed cooler element) may be utilised with any of the embodiments described herein which utilise a spacer ring that is a substantially full width spacer ring. That is to say that extends substantially a whole distance from an outer surface of a fluid retaining layer to an outer surface of an end fitting. It will of course be appreciated that a cap or cover may be located radially outside of the spacer ring. The heater and/or cooler element can be utilised to select and maintain a pre-determined temperature and/or temperature profile over time which can help control build-up of material on the inner bore of the pipe and can help control viscosity of transported fluids.

Figure 14:
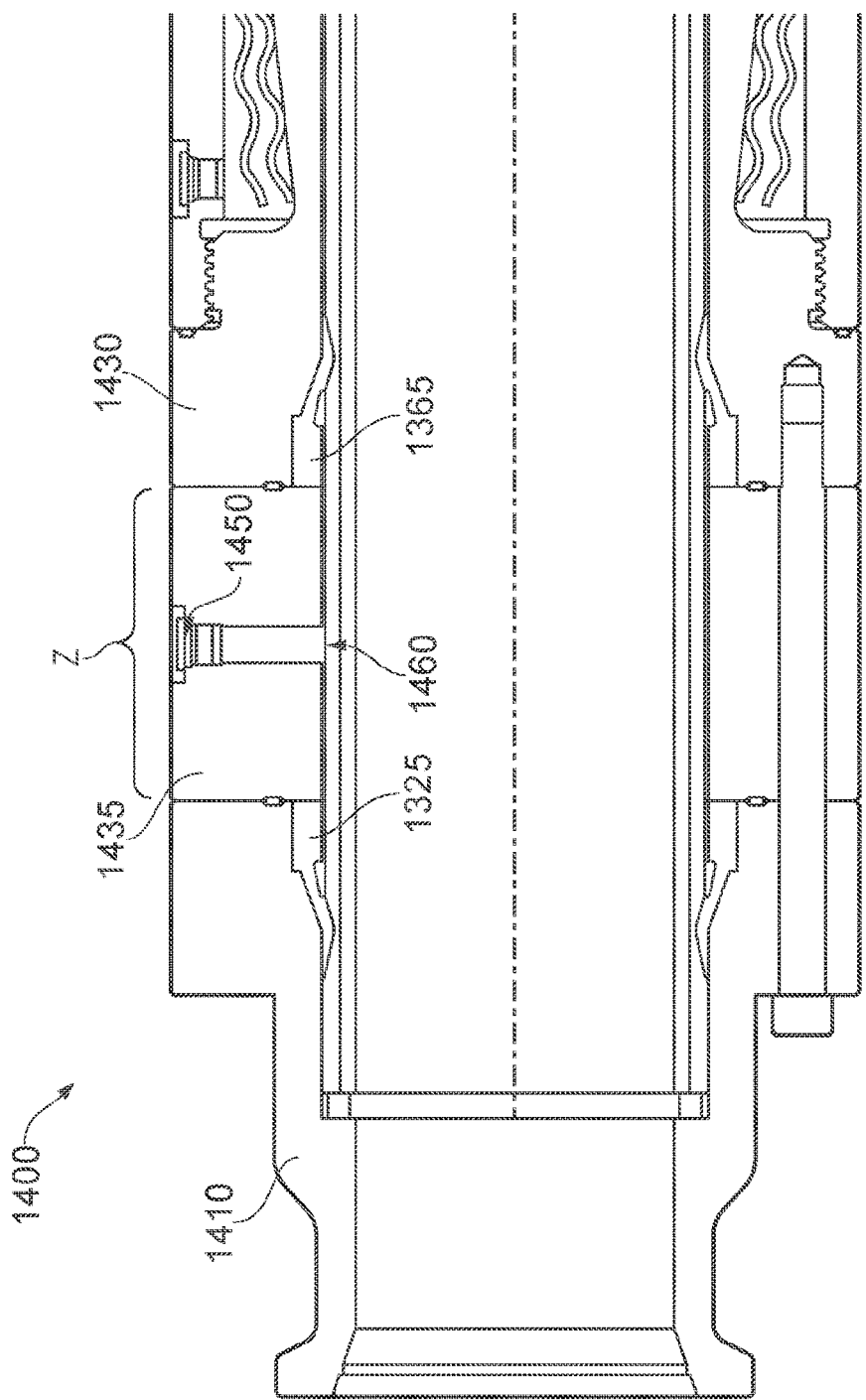
FIG. 14 illustrates an observation port in a spacer ring in a sealed-off-zone.

FIG. 14 helps illustrate how a multi-component end fitting 1400, which includes a termination portion 1410 and core portion 1430, can be kept spaced apart by an interposed spacer ring. As illustrated in FIG. 14 a spacer ring 1435 can include at least one observation port 1450 which extends from a radially outer edge surface of the spacer ring member 1435 to a test port or opening 1460 at a radially inner edge surface of the spacer ring member. Because the spacer ring is a full width element analysis and/or observation can be carried out directly onto the outer surface of a fluid retaining layer at a desired moment in time. It will be appreciated that such observation ports and passageways can be utilised with many of the embodiments described herein.

FIG. 15 helps illustrate a multi-component end fitting 1500 which includes a termination portion 1510 and a core portion 1530. An interposed spacer ring 1535 is illustrated in FIG. 15. Of note is that the spacer ring 1535 illustrated in FIG. 15 does not have substantially parallel spaced apart sides. Rather an anterior side surface 1540 extends substantially orthogonally between a radially inner and radially outer edge surface of the spacer ring whilst a posterior side surface 1560 is stepped. That is to say the posterior side surface of the spacer ring does not extend in a parallel fashion with the remaining side surface of the spacer ring member. It will be appreciated by those skilled in the art that the shape/configuration of the sides of the spacer ring can be made of any format which substantially mates with an opposed whole anterior end surface of the core portion or indeed a whole posterior end surface of the termination portion. This is true for any of the embodiments described herein.

FIG. 15 also helps illustrate how a spacer ring 1535, can include multiple inset regions 1570. In FIG. 15 six inset regions are illustrated which are formed as independent spaced apart grooves on the inner edge surface of the spacer ring. It with be appreciated that any number of grooves can be utilised according to certain embodiments of the present invention and indeed that a single helical groove could provide the recessed regions. Likewise it will be appreciated that rather than helical grooves or circular grooves single independent recessed regions formed as blind holes or blind slits could be utilised. Likewise the radially inner surface of the spacer ring may alternatively be roughened in any other way to provide inset regions. Because the intermediate spacer ring includes the inset regions, in use, the fluid retaining layer to some extent will be gripped by the spacer ring. This helps prevent or at least reduce a risk of lateral motion (right to left in FIG. 15) of the fluid retaining layer terminated in the end fitting. This helps avoid motion of the fluid retaining layer with respect to any sealing ring which may otherwise risk breaking a seal. It will be appreciated that use of a roughened inner surface of a spacer ring may be utilised with any of the embodiments described herein.

FIG. 16 helps illustrate a multi-component end fitting 1600 which includes a termination portion 1610 and core portion 1630. A spacer ring 1635 is illustrated juxtaposed between opposed surfaces of the termination portion 1610 and core portion 1630. That is to say the spacer ring 1635 as illustrated in FIG. 16 spaces a whole posterior surface of the termination portion away from a whole anterior surface of the core portion 1630. FIG. 16 helps illustrate how a fluid communication passageway 1650 may be formed in an intermediate spacer ring 1635. As illustrated in FIG. 16 the fluid communication passageway includes a first portion 1655 which extends in a substantially radial direction from an external port 1660. The fluid communication passageway also includes an axially extending portion 1665 which extends in an axial direction associated with a main axis of a flexible pipe. The fluid communication passageway opens into a groove 1670 which extends around the posterior surface of the spacer ring. This groove and the axially extending passageway providing fluid communication to it are aligned with the pressure armour layer of the flexible pipe body terminated in the end fitting. In this way annulus fluids can be vented. Using a spacer ring which has at least one fluid communication passageway in it can thus be utilised to help vent annulus fluid. Such an intermediate spacer ring can be retrofitted to a terminated flexible pipe by replacing a pre-existing intermediate spacer ring formed as a blank body (i.e. with a fluid communication passageway) with a spacer ring which includes a required fluid communication passageway. It will be appreciated that a spacer ring could include passageways having different shapes. For example curved or labyrinthine lumens can be used, some of which can meet and communicate with each other in order to achieve the same external port 1660.

FIG. 17 helps illustrate how a spacer ring including a fluid communication passageway can be utilised in accordance with certain embodiments of the present invention which enable a re-sealing to occur. That is to say a spacer ring having a width shown in FIG. 16 can be replaced by one illustrated in FIG. 17 and the termination portion 1610 re-sealed against a pristine region of a barrier layer.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of re-terminating an end of a flexible pipe, comprising:
   removing at least one original end fitting component from a multi-component end fitting, secured to a flexible pipe body at an end of a flexible pipe, leaving a retained portion of the multi-component end fitting in situ; and
   subsequently securing at least one superseding end fitting component to the retained portion thereby providing a new fluid tight seal against a fluid retaining layer of the flexible pipe at a new sealing location axially displaced from an original sealing location.

2. The method as claimed in claim 1, further comprising:
   providing the new fluid tight seal by locating an inner seal ring member and/or outer seal ring member against an outer surface of the fluid retaining layer at a new axial position along a length of the flexible pipe body spaced apart from an axial position associated with the original sealing location.

3. The method as claimed in claim 1, further comprising:
   removing the at least one original end fitting component and subsequently providing the new fluid tight seal without cutting off the multi-component end fitting from a remainder of the flexible pipe by cutting through a whole cross-section of the flexible pipe body.

4. The method as claimed in claim 1, wherein removing the at least one original end fitting component comprises:
   removing at least one of a termination portion and/or an inner seal ring member and/or an inner spacer ring member and/or an inner ring insert member.

5. The method as claimed in claim 1, wherein removing the at least one original end fitting component comprises:
   removing at least one of an outer spacer ring member and/or an outer seal ring member and/or an outer collar member.

6. The method as claimed in claim 1, further comprising:
   replacing the at least one original end fitting component with a corresponding replacement component that comprises the superseding end fitting component and that has a width dimension greater than or less than a corresponding original width dimension of the at least one original end fitting component.

7. The method as claimed in claim 6, further comprising replacing the at least one original end fitting component with the replacement component by:
   unsecuring and then removing the at least one original end fitting component from the retained portion of the multi-component end fitting; and
   subsequently locating the replacement component adjacent to the retained portion of the multi-component end fitting and directly or indirectly securing the replacement component thereto.

8. The method as claimed in claim 7, comprising:
   removing an original termination portion of the multi-component end fitting that comprises a posterior end flange from an end of a region of the flexible pipe body together with an inner seal ring member and an inner ring insert member; and
   locating a replacement termination portion having a posterior end flange wider or less wide than a corresponding width of the posterior end flange of the original termination portion against a flange of a retained core portion of the end fitting;
   whereby a replacement inner seal ring member and/or inner ring insert member are located in a recessed region between the replacement termination portion and an outer surface of the fluid retaining layer.

9. The method as claimed in claim 7, comprising:
   removing an original termination portion of the multi-component end fitting that comprises a posterior end flange from an end of a region of the flexible pipe body together with an inner seal ring member and an inner ring insert member;
   removing an original spacer ring member from a location adjacent to a retained core portion of the multi-component end fitting;
   locating a posterior side of a replacement inner spacer ring member having a width more or less wide than a width of an original inner spacer ring member against a flange of a retained core portion of the multi-component end fitting;
   locating the original termination portion, or a replacement termination portion, and the inner seal ring member, or a replacement inner seal ring member, located in a recessed region between the original termination portion, or the replacement termination portion, and an outer surface of the fluid retaining layer against an anterior side of the replacement inner spacer ring member; and
   securing the original termination portion, or the replacement termination portion, to the replacement inner spacer ring member.

10. The method as claimed in claim 6, further comprising:
    removing an original collar member of the multi-component end fitting together with an outer seal ring member and an outer spacer ring member; and
    locating a replacement outer spacer ring member having a width greater than or less than a corresponding width of the removed outer spacer ring member against a posterior surface of a jacket member of the multi-component end fitting;
    thereby locating a replacement outer seal ring member in a recessed region between the replacement outer spacer ring member and an outer surface of the fluid retaining layer.

11. The method as claimed in claim 10, wherein the fluid retaining layer comprises an outer sheath of the flexible pipe.

12. The method as claimed in claim 6, further comprising:
    removing an original collar member of the multi-component end fitting together with an outer seal ring member and an outer spacer ring member; and
    locating an additional outer spacer ring member against a posterior surface of a jacket member of the multi-component end fitting;
    thereby locating the outer seal ring member, or a replacement outer seal ring member, in a recessed region between the outer spacer ring member, or a replacement outer spacer ring member, and an outer surface of the fluid retaining layer, the outer spacer ring member, or the replacement outer spacer ring member, being spaced apart from the posterior surface of the jacket by the additional outer spacer ring member.

13. The method as claimed in claim 1, further comprising:
    unsecuring and then removing an original termination portion of the multi-component end fitting that comprises a posterior end flange from an end region of the flexible pipe body together with an inner seal ring member and an inner ring insert member;

locating a superseding termination portion comprising the superseding end fitting component and the inner seal ring member, or a replacement inner seal ring member, in a recessed region between the superseding termination portion and an outer surface of the fluid retaining layer against an anterior side of a retained core portion of the end fitting; and securing the superseding termination portion directly to the retained core portion.

14. The method as claimed in claim 1, further comprising:

cutting a portion off an end of the fluid retaining layer from a remainder of the fluid retaining layer subsequent to removal of the at least one original end fitting component.

15. The method as claimed in claim 14, further comprising:

subsequent to the cutting the portion off the end of the fluid retaining layer, determining at least one characteristic associated with said portion of the fluid retaining layer.

16. The method as claimed in claim 1, wherein the fluid retaining layer comprises a barrier layer or liner of the flexible pipe.

* * * * *